(12) United States Patent
Katis et al.

(10) Patent No.: US 8,533,611 B2
(45) Date of Patent: Sep. 10, 2013

(54) BROWSER ENABLED COMMUNICATION DEVICE FOR CONDUCTING CONVERSATIONS IN EITHER A REAL-TIME MODE, A TIME-SHIFTED MODE, AND WITH THE ABILITY TO SEAMLESSLY SHIFT THE CONVERSATION BETWEEN THE TWO MODES

(75) Inventors: Thomas E. Katis, Jackson, WY (US); James T. Panttaja, Healdsburg, CA (US); Mary G. Panttaja, Healdsburg, CA (US); Matthew J. Ranney, Oakland, CA (US)

(73) Assignee: Voxer IP LLC, San Francisco, CA (US)

( * ) Notice: Subject to any disclaimer, the term of this patent is extended or adjusted under 35 U.S.C. 154(b) by 742 days.

(21) Appl. No.: 12/561,089

(22) Filed: Sep. 16, 2009

(65) Prior Publication Data

US 2011/0035687 A1 Feb. 10, 2011

Related U.S. Application Data

(60) Provisional application No. 61/232,627, filed on Aug. 10, 2009.

(51) Int. Cl.
*G06F 3/00* (2006.01)
*G06F 15/16* (2006.01)
*H04M 11/00* (2006.01)
*H04M 1/14* (2006.01)
*H04M 11/10* (2006.01)
*H04L 12/66* (2006.01)
*H04W 72/00* (2009.01)

(52) U.S. Cl.
USPC ........... 715/758; 715/716; 715/751; 715/753; 715/756; 379/88.13; 379/88.22; 379/93.01; 379/93.15; 370/352; 455/413; 455/452.2; 709/204; 709/228

(58) Field of Classification Search
USPC .............. 715/758, 751, 753, 756; 379/88.13, 379/88.22, 93.01, 93.15; 455/413, 452.2
See application file for complete search history.

(56) References Cited

U.S. PATENT DOCUMENTS

| | | | |
|---|---|---|---|
| 4,807,224 | A | 2/1989 | Naron et al. |
| 5,117,422 | A | 5/1992 | Hauptschein et al. |
| 5,283,818 | A | 2/1994 | Klausner et al. |
| 5,375,018 | A | 12/1994 | Klausner et al. |

(Continued)

FOREIGN PATENT DOCUMENTS

| | | |
|---|---|---|
| WO | WO 03/073642 | 9/2003 |
| WO | WO 2006/114673 | 11/2006 |
| WO | WO 2007/026320 | 3/2007 |

OTHER PUBLICATIONS

Virtual Chat Room TinyChat Adds Video Conferencing and Screen Sharing (published May 27, 2009) http://techcrunch.com/2009/05/27/virtual-chat-room-tinychat-adds-video-conferencing-and-screen-sharing/.*

(Continued)

*Primary Examiner* — Alvin Tan
*Assistant Examiner* — Rinna Yi
(74) *Attorney, Agent, or Firm* — Beyer Law Group LLP

(57) ABSTRACT

A browser enabled communication device capable of conducting conversations, including multiple media types, in either a real-time or a time-shifted mode, with the ability to seamlessly transition between the two modes.

73 Claims, 11 Drawing Sheets

(56) References Cited

U.S. PATENT DOCUMENTS

| | | |
|---|---|---|
| 5,390,236 A | 2/1995 | Klausner et al. |
| 5,487,167 A | 1/1996 | Dinallo et al. |
| 5,524,140 A | 6/1996 | Klausner et al. |
| 5,572,576 A | 11/1996 | Klausner et al. |
| 5,692,213 A | 11/1997 | Goldberg et al. |
| 5,734,963 A | 3/1998 | Fitzgerald et al. |
| 5,737,011 A | 4/1998 | Lukacs |
| 5,918,158 A | 6/1999 | LaPorta et al. |
| 5,963,551 A | 10/1999 | Minko |
| 5,970,122 A | 10/1999 | LaPorta et al. |
| 6,037,932 A | 3/2000 | Feinleib |
| 6,092,120 A | 7/2000 | Swaminathan et al. |
| 6,104,757 A | 8/2000 | Rhee |
| 6,175,619 B1 | 1/2001 | DeSimone |
| 6,233,389 B1 | 5/2001 | Barton et al. |
| 6,262,994 B1 | 7/2001 | Dirschedl et al. |
| 6,378,035 B1 | 4/2002 | Parry et al. |
| 6,480,783 B1 | 11/2002 | Myr |
| 6,507,586 B1 | 1/2003 | Satran et al. |
| 6,564,261 B1 | 5/2003 | Gudjonsson et al. |
| 6,577,599 B1 | 6/2003 | Gupta et al. |
| 6,580,694 B1 | 6/2003 | Baker |
| 6,671,732 B1 | 12/2003 | Weiner |
| 6,717,925 B1 | 4/2004 | Leppisaari et al. |
| 6,721,703 B2 | 4/2004 | Jackson et al. |
| 6,791,949 B1 | 9/2004 | Ryu et al. |
| 6,807,565 B1 | 10/2004 | Dodrill et al. |
| 6,807,578 B2 | 10/2004 | Satran et al. |
| 6,829,473 B2 | 12/2004 | Raman et al. |
| 6,834,039 B1 | 12/2004 | Kelly et al. |
| 6,850,965 B2 | 2/2005 | Allen |
| 6,912,544 B1 | 6/2005 | Weiner |
| 6,931,114 B1 | 8/2005 | Martin |
| 6,970,926 B1 | 11/2005 | Needham et al. |
| 6,973,309 B1 | 12/2005 | Rygula et al. |
| 6,993,009 B2 | 1/2006 | Kelly et al. |
| 6,996,624 B1 | 2/2006 | LeCroy et al. |
| 7,002,913 B2 | 2/2006 | Huang et al. |
| 7,039,040 B1 | 5/2006 | Burg |
| 7,039,675 B1 | 5/2006 | Kato |
| 7,047,030 B2 | 5/2006 | Forsyth |
| 7,111,044 B2 | 9/2006 | Lee |
| 7,117,521 B2 | 10/2006 | Puthiyedath |
| 7,139,371 B1 | 11/2006 | McElvaney |
| 7,171,491 B1 | 1/2007 | O'Toole et al. |
| 7,187,941 B2 | 3/2007 | Siegel |
| 7,218,709 B2 | 5/2007 | Garg et al. |
| 7,233,589 B2 | 6/2007 | Tanigawa et al. |
| 7,236,738 B2 | 6/2007 | Settle |
| 7,240,105 B2 | 7/2007 | Satran et al. |
| 7,304,951 B2 | 12/2007 | Rhee |
| 7,305,438 B2 | 12/2007 | Christensen et al. |
| 7,313,593 B1 | 12/2007 | Pulito et al. |
| 7,349,871 B2 | 3/2008 | Labrou et al. |
| 7,382,881 B2 | 6/2008 | Uusitalo et al. |
| 7,403,775 B2 | 7/2008 | Patel et al. |
| 7,626,951 B2 | 12/2009 | Croy et al. |
| 2001/0025377 A1 | 9/2001 | Hinderks |
| 2002/0128029 A1 | 9/2002 | Nishikawa et al. |
| 2002/0130904 A1* | 9/2002 | Becker et al. ............... 345/753 |
| 2002/0150094 A1 | 10/2002 | Cheng et al. |
| 2002/0154745 A1 | 10/2002 | Shtivelman |
| 2002/0159600 A1 | 10/2002 | Weiner |
| 2002/0184368 A1 | 12/2002 | Wang |
| 2003/0027566 A1 | 2/2003 | Weiner |
| 2003/0028632 A1 | 2/2003 | Davis |
| 2003/0099198 A1 | 5/2003 | Kiremidjian et al. |
| 2003/0126162 A1 | 7/2003 | Yohe et al. |
| 2003/0186722 A1 | 10/2003 | Weiner |
| 2004/0017905 A1 | 1/2004 | Warrier et al. |
| 2004/0019539 A1 | 1/2004 | Raman et al. |
| 2004/0074448 A1 | 4/2004 | Bunt |
| 2004/0090959 A1 | 5/2004 | Cinghita et al. |
| 2004/0095900 A1 | 5/2004 | Siegel |
| 2004/0117722 A1 | 6/2004 | Harada |
| 2004/0192353 A1 | 9/2004 | Mason et al. |
| 2004/0192378 A1 | 9/2004 | Wulkan |
| 2004/0252679 A1 | 12/2004 | Williams et al. |
| 2004/0255148 A1 | 12/2004 | Monteiro et al. |
| 2004/0258220 A1 | 12/2004 | Levine et al. |
| 2005/0021819 A1 | 1/2005 | Kilkki |
| 2005/0025308 A1 | 2/2005 | Tischer et al. |
| 2005/0030932 A1 | 2/2005 | Kelly et al. |
| 2005/0037706 A1 | 2/2005 | Settle |
| 2005/0053033 A1 | 3/2005 | Kelly et al. |
| 2005/0102358 A1 | 5/2005 | Gold et al. |
| 2005/0135333 A1 | 6/2005 | Rojas |
| 2005/0138002 A1* | 6/2005 | Giacobbe et al. ............... 707/3 |
| 2005/0144247 A1 | 6/2005 | Christensen et al. |
| 2005/0160345 A1 | 7/2005 | Walsh et al. |
| 2005/0202807 A1 | 9/2005 | Ayyasamy |
| 2005/0207487 A1 | 9/2005 | Monroe |
| 2005/0215228 A1 | 9/2005 | Fostick et al. |
| 2005/0220137 A1 | 10/2005 | Prigent et al. |
| 2005/0259682 A1 | 11/2005 | Yosef et al. |
| 2005/0288101 A1 | 12/2005 | Lockton et al. |
| 2006/0007943 A1 | 1/2006 | Fellman |
| 2006/0045038 A1 | 3/2006 | Kay et al. |
| 2006/0059267 A1 | 3/2006 | Cugi et al. |
| 2006/0059342 A1 | 3/2006 | Medvinsky et al. |
| 2006/0093304 A1 | 5/2006 | Battey et al. |
| 2006/0095849 A1* | 5/2006 | Vertaschitsch et al. ....... 715/717 |
| 2006/0107285 A1 | 5/2006 | Medvinsky |
| 2006/0146822 A1 | 7/2006 | Kolakowski et al. |
| 2006/0173951 A1* | 8/2006 | Arteaga et al. ............... 709/203 |
| 2006/0187897 A1 | 8/2006 | Dabbs et al. |
| 2006/0189305 A1 | 8/2006 | Ando et al. |
| 2006/0212582 A1 | 9/2006 | Gupta et al. |
| 2006/0212592 A1 | 9/2006 | Gupta et al. |
| 2006/0224748 A1 | 10/2006 | Gupta et al. |
| 2006/0244588 A1 | 11/2006 | Hannah et al. |
| 2006/0245367 A1 | 11/2006 | Jeffery et al. |
| 2006/0253599 A1 | 11/2006 | Monteiro et al. |
| 2006/0256816 A1* | 11/2006 | Yarlagadda et al. .......... 370/466 |
| 2006/0268750 A1 | 11/2006 | Weiner |
| 2006/0274698 A1 | 12/2006 | Twitchell |
| 2006/0276714 A1 | 12/2006 | Holt et al. |
| 2006/0282544 A1 | 12/2006 | Monteiro et al. |
| 2006/0288391 A1 | 12/2006 | Puthiyedath |
| 2006/0294259 A1 | 12/2006 | Matefi et al. |
| 2007/0001869 A1 | 1/2007 | Hunzinger |
| 2007/0005970 A1* | 1/2007 | Trupp et al. ............... 713/170 |
| 2007/0071206 A1* | 3/2007 | Gainsboro et al. ............ 379/168 |
| 2007/0180032 A1 | 8/2007 | Pearson |
| 2007/0182819 A1 | 8/2007 | Monroe |
| 2007/0207785 A1 | 9/2007 | Chatterjee et al. |
| 2008/0000979 A1 | 1/2008 | Poisner |
| 2008/0002621 A1 | 1/2008 | Ginzburg et al. |
| 2008/0002691 A1 | 1/2008 | Qi et al. |
| 2008/0037721 A1* | 2/2008 | Yao et al. ............... 379/88.11 |
| 2008/0086700 A1 | 4/2008 | Rodriguez et al. |
| 2008/0134054 A1 | 6/2008 | Clark et al. |
| 2008/0205444 A1* | 8/2008 | Campbell et al. ............. 370/469 |
| 2009/0063698 A1 | 3/2009 | Xu et al. |
| 2009/0175425 A1 | 7/2009 | Lee |
| 2010/0034201 A1* | 2/2010 | Barave et al. ............... 370/389 |

OTHER PUBLICATIONS

Google Voice Makes the Phone Less Loathsome_Smarterware (published Mar. 23, 2009) http://smarterware.org/1032/google-voice-makes-the-phone-less-loathsome.*

How to Send or Share a File With iChat (published Feb. 27, 2009) http://www.macosxtips.co.uk/index_files/send-or-share-a-file-with-ichat.php.*

HotRecorder-Record Skype Calls (published Mar. 25) http://skypejournal.com/blog/archives/2005/03/hotrecorder_rec.php.* iPhone: About Visual Voicemail (published Jul. 10, 2008) http://support.apple.com/kb/HT1486.*

Hands-On:Tweetie for Mac Shakes Up Twitterverse (published Apr. 20, 2009) http://www.wired.com/business/2009/04/review-tweetie/.*

WikiPedia—The Free Encyclopedia, "*Eudora (email client),*" http://en.wikipedia.org/wiki/Eudora_(e-mail_client), Downloaded on Aug. 20, 2009, 3 pages.

"*Eudora,*" Answers.com, http://www.answers.com/topic/eudora-e-mail-client, Downloaded on Aug. 20, 2009, 4 pages.

"*The Eudora Open Messaging Advantage,*" Qualcomm, 1997, Part No. 100-50030-1, 23 pages.

"*Aspera—Next Generation File Transport—Broadcasting & Entertainment Media,*" Asperasoft.com, http://www.asperasoft.com/en/industries/digital_media_10/Broadcast_Entertainment_Media_5, Downloaded on Sep. 22, 2009, 2 pages.

"*Aspera—Next Generation File Transport—fasp™ transfer times,*" Asperasoft.com, http://www.asperasoft.com/en/technology/fasp_transfer_times_14/fasp_transfer_times_14, Downloaded on Sep. 22, 2009, 1 page.

"*Aspera—Next Generation File Transport—the fasp solution,*" Asperasoft.com, http://www.asperasoft.com/en/technology/fasp_solution_3/the_fasp_solution_3, Downloaded on Sep. 22, 2009, 3 pages.

"*Aspera—Next Generation File Transport—the shortcomings of TCP file transfer,*" Asperasoft.com, http://www.asperasoft.com/en/technology/shortcomings_of_TCP_2/the_shortcomings_of_TCP_file_transfer_2, Downloaded on Sep. 22, 2009, 2 pages.

"*Aspera—Next Generation File Transport—fasp technology overview*" Asperasoft.com, http://www.asperasoft.com/en/technology/fasp_overview_1/fasp_technology_overview_1, Downloaded on Sep. 22, 2009, 2 pages.

"*Aspera fasp™ High Speed Transport—A Critical Technology Comparison,*" White Paper, Asperasoft.com, http://www.asperasoft.com/en/technology/white_papers_13/aspera_fasp_high_speed_transport_13, Downloaded on Sep. 22, 2009, 11 pages.

"*Palringo Brings First Push-to-Talk Application to the iPhone,*" RedOrbit.com, http://www.redorbit.com/news/technology/1525545/palringo_brings_first_pushto_talk_application_to_the_iphone/index.html, Downloaded on Aug. 13, 2009, 2 pages.

*Palringo—Features,*Palringo.com, http://www.palringo.com/en/gb/features/, Downloaded on Aug. 13, 2009, 1 page.

Moren, Dan, "*Palringo Brings Picture Messaging to Iphone,*" http://www.pcworld.com/article/149108/palringo_brings_picture_messaging_to_iphone.html, Downloaded on Aug. 13, 2009, 3 pages.

Paul, Ryan, "*Gmail gets Google Talk integration,*"Arstechnica.com, http://arstechnica.com/old/content/2006/02/6128.ars , Downloaded on Aug. 20, 2009, 1 page.

Sherman, Chris, "*Google Integrates Chat with Gmail,*"Search Engine Watch, http://searchenginewatch.com/3583121, Feb. 7, 2006, Downloaded on Aug. 20, 2009, 2 pages.

"*About Gmail,*" http://mail.google.com/mail/help/chat.html, Downloaded on Aug. 20, 2009, 3 pages.

WikiPedia—The Free Encyclopedia, "*Google Talk,*" http://en.wikipedia.org/wiki/Google_Talk, Downloaded on Aug. 20, 2009, 8 pages.

Azuri, Calvin, "*Palringo Gold Launched on BlackBerry Smartphone*", Apr. 20, 2009, http://ivr.tmcnet.com/topics/ivr-voicexml/articles/54573-palringo-gold-launched-blackberry-smartphone.htm, Downloaded on Aug. 13, 2009, 3 pages.

Liaw, Kim Poh, "*Palringo launches its IM Software for Android Phones,*" Slashphone.com, Mar. 24, 2009, http://www.slashphone.com/palringo-launches-its-im-software-for-android-phones-245111, Downloaded on Aug. 13, 2009, 8 pages.

WikiPedia—The Free Encyclopedia, "*Palringo*" http://en.wikipedia.org/wiki/Palringo, Downloaded on Aug. 13, 2009, 1 page.

"*dircproxy,*" http://home.pcisys.net/~tbc/hacks/dircproxy.htm, Downloaded on Sep. 26, 2008, 1 page.

Apple Inc., "*iPhone User's Guide,*" http://manuals.info.apple.com/en_US/iPhone_User_Guide.pdf, Downloaded on Oct. 3, 2008, 154 pages.

Brandx.net, "*Using Talk,*" http://www.brandx.net/support/usingtelnet/talk.shtml, Downloaded on Sep. 19, 2008, 2 pages.

Businesswire.com "*LignUp 4.0 Delivers Industry's Most Comprehensive Suite of Communications Web Services,*" http://www.businesswire.com/portal/site/google/index.jsp?ndmViewId=news_view&newsId=20070430005498&newsLang=en, Downloaded on Nov. 21, 2008, 10 pages.

Calore, Michael, "*SpinVox Moves Into VoIP, Brings Voice-to-Text to Skype Users,*" Monkey_Bites, http://blog.wired.com/monkeybites/2007/08/spinvox-moves-i.html, Downloaded on Oct. 3, 2008, 4 pages.

Cardei et al., "*MAC Layer QoS Support for Wireless Networks of Unmanned Air Vehicles,*" Proceedings of the 37th Hawaii International Conference on System Sciences—2004, Jan. 5-8, 2004 pp. 9 pp.

Charny, Ben, "*Nextel pushes new 'push to talk' features,*" URL: http://news.zdnet.com/2100-9584_22-134945.html, Mar. 18, 2004, 3 pages.

Chen et al., "*An Adaptive Multimedia Transmission Protocol for Distributed Multimedia Applications,*" Proceedings of the 5th International Workshop on Multimedia Network Systems and Applications (MNSA'2003), in conjunction with The 23rd International Conference on Distributed Computing Systems (ICDCS—2003), 6 pages.

Dannen, Chris, "*Technology: The Skype Mobile Phone Will Blow Your Mind,*" Dec. 18, 2007, URL: http://www.fastcompany.com/blog/chris-dannen/lab/technology-skype-mobile-phone-will-blow-your-mind, 2 pages.

Erwu et al., "*Packet-late indication based (PLIB): adaptive jitter buffer,*" ACM International Conference Proceeding Series; vol. 58, Proceedings of the winter international symposium on Information and communication technologies, Cancun, Mexico, Session: Performance, reliability, and quality of service, pp. 1-5 Year of Publication: 2004.

FAQS.org, "*RFC1644—T/TCP—TCP Extensions for Transactions Functional S,*" http://www.faqs.org/rfcs/rfc1644.html, Downloaded on Sep. 19, 2008, 26 pages.

FluidVoice "*Overview of FluidVoice,*" http://viral.media.mit.edu/wiki/tiki-index.php?page=FluidVoice, Downloaded on Sep. 16, 2008, 2 pages.

GrandCentral.com, "*Call Record,*" http://www.grandcentral.com/howitworks/call_record, Downloaded on Sep. 26, 2008, 1 page.

GrandCentral.com, "*One Voicemail Box,*" http://www.grandcentral.com/home/one_voicemail, Downloaded on Sep. 26, 2008, 1 page.

GrandCentral.com, "*So Many Features, You Won't Believe it,*" http://www.grandcentral.com/support/howitworks/, Downloaded on Sep. 26, 2008, 1 page.

GrandCentral.com, "*Voicemail forwarding,*" http://www.grandcentral.com/howitworks/voicemail_forwarding, Downloaded on Sep. 26, 2008, 1 page.

Henshall, Stuart, "*HotRecorder—Record Skype Calls,*" Skype Journal, URL: http://skypejournal.com/blog/archives/2005/03/hotrecorder_rec.php, Mar. 25, 2005, 11 pages.

IRCHelp.org, "*An IRC Tutorial,*" http://www.irchelp.org/irchelp/irctutorial.html, Downloaded on Sep. 26, 2008, 14 pages.

Kadoink.com, "*Get a Widget,*" http://www.kadoink.com/index.cfm?action=getWidgets, Downloaded on Sep. 19, 2008, 3 pages.

Krishnan et al., "*EVRC-Wideband: The New 3GPP2 Wideband Vocoder Standard,*" IEEE International Conference on Acoustics, Speech and Signal Processing, 2007. ICASSP 2007, Publication Date: Apr. 15-20, 2007, vol. 2, on pp. II-333-II-336, Honolulu, HI.

Layton, Julia, "*How Slingbox Works,*" Jan. 4, 2006, HowStuffWorks.com, http://electronics.howstuffworks.com/slingbox.htm, 9 pages.

LignUp.com, "*LignUp Communications Applications Server,*" http://www.lignup.com/platform/index.html, Downloaded on Sep. 19, 2008, 1 page.

Network Dictionary, "*Instant Message (IM) Technology Overview,*" http://www.networkdictionary.com/networking/im.php, Downloaded on Sep. 16, 2008, 2 pages.

Nikotalkie.com, "*Nikotalkie—Home,*" http://www.nikotalkie.com/, Downloaded on Sep. 19, 2008, 2 pages.

Nikotel.com, "*Click-Pop-Talk WebStart Phone,*" http://www.nikotel.com/nikotel-click-pop-talk-java-phone.html, Downloaded on Sep. 19, 2008, 1 page.

Notaras, George, "*dircproxy IRC Proxy,*" http://www.g-loaded.cu/2007/02/01/dircproxy-irc-proxy/, Downloaded on Sep. 26, 2008, 4 pages.

Pash, Adam, "*Consolidate Your Phones with GrandCentral*," http://techgroup.groups.vox.com/library/post/6a00cd978d0ef7f9cc00e398b8ff7a0002.html, Downloaded on Sep. 19, 2008, 5 pages.

Patel, Nilay, "*Apple patent reveals data-to-voice translation system for cellphones*," Jul. 28, 2007, URL: http://www.engadget.com/2007/07/28/apple-patent-reveals-data-to-voice-translation-system-for-cellph/, 5 pages.

Piecuch et al., "*A Selective Retransmission Protocol for Multimedia on the Internet*," In Proceedings of SPIE Multimedia Systems and Applications, Nov. 2000, Boston MA, USA, 12 pages.

Qiao et al., "*SCTP Performance Issue on Path Delay Differential*," Lecture Notes in Computer Science, Springer Berlin / Heidelberg ISSN 0302-9743 (Print) 1611-3349 (Online) vol. 4517/2007, Wired/Wireless Internet Communications, pp. 43-54 Sunday, Jun. 24, 2007.

Ramo et al., "*On comparing speech quality of various narrow- and wideband speech codecs*," Proceedings of the Eighth International Symposium on Signal Processing and Its Applications, 2005. Publication Date: Aug. 28-31, 2005, vol. 2, on pp. 603-606.

Rey et al., "I-D Action:draft-ietf-avt-rtp-retransmission-09.txt," Aug. 5, 2003, http://osdir.com/ml/ietf.avt/2003-08/msg00003.html, Downloaded on Sep. 19, 2008, 2 pages.

Ribbit.com, "*Amphibian*," http://www.ribbit.com/everyday/, Downloaded on Sep. 26, 2008, 1 page.

Ribbit.com, "*Enhanced Visual Voicemail*," http://www.ribbit.com/everyday/tour/enhanced_visual_voicemail.php, Downloaded on Sep. 26, 2008, 2 pages.

Ribbit.com, "*What is Ribbit? Features*," http://www.ribbit.com/platform/features.php, Downloaded on Sep. 26, 2008, 1 page.

Ribbit.com, "*What is Ribbit? Overview*," http://www.ribbit.com/platform/index.php, Downloaded on Sep. 26, 2008, 1 page.

Ribbit.com, "*What is Ribbit? Voice Architecture*," http://www.ribbit.com/platform/architecture.php, Downloaded on Sep. 26, 2008, 2 pages.

Saito et al., "*IP Packet Loss Compensation Scheme with Bicast and Forwarding for Handover in Mobile Communications*," 2006 IEEE 17th International Symposium on Personal, Indoor and Mobile Radio Communications, Sep. 2006, pp. 1-5, Helsinki.

Skype.com, "*Making calls is just the start*," URL: http://www.skype.com/features/, Downloaded on Sep. 16, 2008, 2 pages.

Spinvox.com, "*Home Page*," http://www.spinvox.com/, Downloaded on Sep. 26, 2008, 3 pages.

Spinvox.com, "*How Does it Work?*," http://www.spinvox.com/how_it_works.html, Downloaded on Sep. 19, 2008, 2 pages.

Swissvoice.net, "*PSTN*," http://www.swissvoice.net/ww/htm_ww/08_technology/content_pstn.html, Downloaded on Sep. 19, 2008, 3 pages.

Tektronix, "*VOIP Technology Overview; Protocols, Convergence, Testing*," http://www.tektronics.com/voip, May 12, 2006.

The Jabber Extensible Communications Platform™, "*Products // Jabber XCP*," URL: http://www.jabber.com/CE/JabberXCP, Downloaded on Sep. 16, 2008, 2 pages.

ThunkDfferent.com, "*YouMail vs. Google Grandcentral Voice Mail Service*," http://thunkdifferent.com/2007/10/11/youmail-vs-google-grandcentral-voice-mailservice/, Downloaded on Oct. 3, 2008, 6 pages.

VOIP-News.com, "*Company Profile, LignUp*," http://www.voip-news.com/vendors/lignup/, Downloaded on Dec. 5, 2008, 6 pages.

WikiBooks, "*Internet Technologies/IRC*," http://en.wikibooks.org/wiki/Internet_Technologies/IRC, Downloaded on Sep. 19, 2008, 4 pages.

WikiPedia—The Free Encyclopedia, "*E-mail*," http://en.wikipedia.org/wiki/E-mail, Downloaded on Sep. 19, 2008, 8 pages.

WikiPedia—The Free Encyclopedia, "*Internet Relay Chat*," http://en.wikipedia.org/wiki/Internet_Relay_Chat, Downloaded on Oct. 3, 2008, 11 pages.

WikiPedia—The Free Encyclopedia, "*Spinvox*," http://en.wikipedia.org/wiki/Spinvox, Downloaded on Sep. 26, 2008, 1 page.

WikiPedia—The Free Encyclopedia, "*TiVo*", http://en.wikipedia.org/wiki/TiVo, Downloaded on Sep. 16, 2008, 6 pages.

Yavuz et al., "*VoIP over cdma2000 1xEV-DoO Revision A*," IEEE Communications Magazine, Feb. 2006, pp. 88-95.

HotRecorder.com, "*Features*," http://www.hotrecorder.com/music_features.asp, downloaded on Sep. 26, 2008, 1 page.

HotRecorder.com, "*Help*," http://www.hotrecorder.com/music_help.asp, downloaded on Sep. 26, 2008, 3 pages.

HotRecorder.com, "*FAQs*," http://www.hotrecorder.com/music_support.asp, downloaded on Sep. 26, 2008, 1 page.

WikiPedia—The Free Encyclopedia, "*Skype*," http://en.wikipedia.org/wiki/Skype, Downloaded on Sep. 26, 2008, 7 pages.

WikiPedia—The Free Encyclopedia, "*Skype Protocol*," http://en.wikipedia.org/wiki/Skype, Downloaded on Sep. 26, 2008, 4 pages.

Jabber.org, "*Main page*," http://www.jabber.org/web/main_page, Sep. 2, 2008, downloaded on Sep. 26, 2008, 1 page.

Jabber.org, "*FAQ*," http://www.jabber.org/web/faq, Sep. 4, 2008, downloaded on Sep. 26, 2008, 2 pages.

Apple Inc., "*iPhone: About Visual Voicemail*," http://www.support.apple.com/kb/HT1486, Downloaded on Sep. 26, 2008, 3 pages.

Jabber.org, "*Products // Jabber XCP // Benefits*," http://www.jabber.com/CE/JabberXCPBenefits, downloaded on Sep. 26, 2008, 1 page.

Jabber.org, "Products //Jabber Clients," http://www.jabber.com/CE/JabberClients, downloaded on Sep. 26, 2008, 1 page.

Jabber.org, "*Products // JabberNow*" http://www.jabber.com/CE/JabberNow, downloaded on Sep. 26, 2008, 1 page.

KillerStartups.com, "*Kadoink.com—Mobilizing your Socializing*," http://www.killerstartups.com/Web20/kadoink-com-moblizing-your-socializing, Downloaded on Sep. 26, 2008, 3 pages.

CNETNews.com, "*Kadoink's phonecast lines officially open for texting*," http://news.cnet.com/8301-17939_109-9829877-2.html, downloaded on Sep. 26, 2008, 1 page.

BusinessWire.com, "*LignUp 4.0 Delivers Industry's Most Comprehensive Suite of Communications Web Services*," Apr. 30, 2007, http://www.businesswire.com/portal/site/google/?ndmViewId=news_view&newsId=20070430005498&newsLang=en, Downloaded on Sep. 26, 2008, 6 pages.

VOIP-News.com, "Company Profile—LignUp," http://www.voip-news.com/vendors/lignup/, Downloaded on Oct. 3, 2008, 6 pages.

JustAnotheriPhoneBlog.com, "Nikotalkie—Just Talk, Don't Type," http://justanotheriphoneblog.com/wordpress/2007/10/13/nikotalkie-just-talk-dont-type/, Downloaded on Sep. 26, 2008, 10 pages.

WikiPedia—The Free Encyclopedia, "*Push to Talk*" http://en.wikipedia.org/wiki/Push_to_talk, Downloaded on Sep. 26, 2008, 3 pages.

WikiPedia—The Free Encyclopedia, "*Slingbox*" http://en.wikipedia.org/wiki/Slingbox, Downloaded on Sep. 26, 2008, 4 pages.

About.com, "*Linux / Unix Command*: talk,"http://linux.about.com/od/commands/l/blcmdl1_talk.htm, Downloaded on Sep. 26, 2008, 2 pages.

Fall, Kevin, "*A Delay-Tolerant Network Architecture for Challenged Internets*," Feb. 2003, http://www.dtnrg.org/docs/papers/IRB-TR-03-003.pdf, 15 pages.

Chuah et al., "Store-and-Forward Performance in a DTN," Vehicular Technology Conference, 2006. VTC 2006—Spring. IEEE 63$^{rd}$, Publication Date: May 7-10, 2006, vol. 1, on pp. 187-191.

Krishnan, et al., "*The SPINDLE Disruption-Tolerant Networking System*," Military Communications Conference, 2007. MILCOM 2007. IEEE Volume , Issue , Oct. 29-31, 2007 pp. 1-7.

WikiPedia—The Free Encyclopedia, "*Visual Voicemail*" http://en.wikipedia.org/wiki/Visual_voicemail, downloaded on Sep. 26, 2008, 1 page.

Amir et al., "*An Overlay Architecture for High Quality VoIP Streams*,", IEEE Transactions on Multimedia, Publication Date: Dec. 2006, vol. 8, Issue:6, on pp. 1250-1262.

Rothermel et al., "*An Adaptive Stream Synchronization Protocol*," Lecture Notes In Computer Science; vol. 1018, Proceedings of the 5th International Workshop on Network and Operating System Support for Digital Audio and Video, pp. 178-189, Year of Publication: 1995.

Baset et al., "*An Analysis of the Skype Peer-to-Peer Internet Telephony Protocol*," INFOCOM 2006. 25th IEEE International Conference on Computer Communications. Proceedings (2006), pp. 1-11.

Cerf et al., "*A Protocol for Packet Network Intercommunication*," Communications, IEEE Transactions on, vol. 22, Issue 5, May 1974 pp. 637-648.

\* cited by examiner

BROWSER ENABLED COMMUNICATION DEVICE FOR CONDUCTING CONVERSATIONS IN EITHER A REAL-TIME MODE, A TIME-SHIFTED MODE, AND WITH THE ABILITY TO SEAMLESSLY SHIFT THE CONVERSATION BETWEEN THE TWO MODES

CROSS-REFERENCE TO RELATED APPLICATIONS

This application claims the benefit of priority to U.S. Provisional Patent Application No. 61/232,627 filed Aug. 10, 2009 and entitled "Methods and Apparatus for Conducting Time-Based Media Conversations In Either A Real-time Mode or a Time-shifted Mode Through a Communication Server and Browser." The above-listed application is incorporated herein by reference in its entirety for all purposes.

BACKGROUND

1. Field of the Invention

This invention pertains to communications, and more particularly, to a browser enabled communication device capable of conducting conversations in either a synchronous real-time mode or asynchronously in a time-shifted mode, and with the ability to seamlessly transition between the two modes.

2. Description of Related Art

Electronic voice communication has historically relied on telephones and radios. Conventional telephone calls required one party to dial another party using a telephone number and waiting for a circuit connection to be made over the Public Switched Telephone Network or PSTN. A full-duplex conversation may take place only after the connection is made. More recently, telephony using Voice over Internet Protocol (VoIP) has become popular. With VoIP, voice communications takes place using IP over a packet-based network, such as the Internet. Radio communication, including Push To Talk (PTT) and PTT over Cellular (PoC) systems, allows a person to communicate with others with the push of a button, without first establishing a two-way connection. Most radio communication is half-duplex, meaning only one person can speak over a single channel at a time. With mobile phones, two-way communication is possible by establishing two channels, each at different frequencies.

Many full-duplex telephony systems have some sort of message recording facility for unanswered calls such as voicemail. If an incoming call goes unanswered, it is redirected to a voicemail system. When the caller finishes the message, the recipient is alerted and may listen to the message. Various options exist for message delivery beyond dialing into the voicemail system, such as email or "visual voicemail", but these delivery schemes all require the entire message to be left by the caller before the recipient can listen to the message.

Many home telephones have answering machine systems that record missed calls. They differ from voicemail in that the caller's voice is often played through a speaker on the answering machine while the message is being recorded. The called party can pick up the phone while the caller is leaving a message, which causes most answering machines to stop recording the message. With other answering machines, however, the live conversation will be recorded unless the called party manually stops the recording. In either recording situation, there is no way for the called party to review the recorded message until after the recording has stopped. As a result, there is no way for the recipient to review any portion of the recorded message other than the current point of the conversation while the conversation is ongoing and is being recorded. Only after the conversation has concluded, and the parties have hung up, or the recipient has manually stopped the recording, can the recipient go back and review the recorded message or conversation.

Some more recent call management systems provide a "virtual answering machine", allowing callers to leave a message in a voicemail system, while giving called users the ability to hear the message as it is being left. The actual answering "machine" is typically a voicemail-style server, operated by the telephony service provider. Virtual answering machine systems differ from standard voice mail systems in that the called party may use either their phone or a computer to listen to messages as they are being left. Similar to an answering machine as described in the preceding paragraph, however, the called party can only listen at the current point of the message as it is being left. There is no way to review previous portions of the message before the message is left in its entirety and the caller hangs up.

Certain mobile phone handsets have been equipped with an "answering machine" feature inside the handset itself that behaves similarly to a landline answering machine as described above. With these answering machines, callers may leave a voice message, which is recorded directly on the phone of the recipient. While the answering machine functionality has been integrated into the phone, the limitations of these answering machines, as discussed above, are still present.

With most current PTT systems, incoming audio is played on the device as it is received. If the user does not hear the message, for whatever reason, the message is irretrievably lost. Either the sender must resend the message or the recipient must request the sender to retransmit the message. PTT messaging systems are known. With these systems, message that are not reviewed live are recorded. The recipient can access the message from storage at a later time. These systems, however, typically do not record messages that are reviewed live by the recipient. See for example U.S. Pat. No. 7,403,775, U.S. Publications 2005/0221819 and 2005/0202807, EP 1 694 044 and WO 2005/101697.

With the growing popularity of the Web, more people are communicating through the Internet. With most of these applications, the user is interfacing through a browser running on their computer or other communication device, such as a mobile or cellular phone or radio, communicating with others through the Internet and one or more communication servers.

With email for example, users may type and send text messages to one another through email clients, located either locally on their computer or mobile communication device (e.g., Microsoft Outlook) or remotely on a server (e.g., Yahoo or Google Web-based mail). In the remote case, the email client "runs" on the computer or mobile communication device through a Web browser. Although it is possible to send time-based (i.e., media that changes over time, such as voice or video) as an attachment to an email, the time-based media can never be sent or reviewed in a "live" or real-time mode. Due to the store and forward nature of email, the time-based media must first be created, encapsulated into a file, and then attached to the email before it can be sent. On the receiving side, the email and the attachment must be received in full before it can be reviewed. Real-time communication is therefore not possible with conventional email.

Skype is a software application intended to run on computers that allows people to conduct voice conversations and video-conferencing communication. Skype is a type of VoIP system, and it is possible with Skype to leave a voice mail message. Also with certain ancillary products, such as Hot Recorder, it is possible for a user to record a conversation conducted using Skype. However with either Skype voice mail or Hot Recorder, it is not possible for a user to review the previous media of the conversation while the conversation is ongoing or to seamlessly transition the conversation between a real-time and a time-shifted mode.

Social networking Web sites, such as Facebook, also allow members to communicate with one another, typically through text-based instant messaging, but video messaging is also supported. In addition, mobile phone applications for Facebook are available to Facebook users. Neither the instant messaging, nor the mobile phone applications, however, allow users to conduct voice and other time-based media conversations in both a real-time and a time-shifted mode and to seamlessly transition the conversation between the two modes.

Google Wave is Web based personal communication and collaboration tool and computing platform designed to merge email, wiki, and instant messaging. Instead of sending a message and its entire thread of previous messages as is typical with conventional email, objects known as "waves" contain a complete thread of multimedia messages (blips) maintained on a central server. Waves are shared and collaborators can be added or removed at any point during the existence of a wave. Any participant can reply anywhere in the message, edit the content, or add participants at any point in the duration of a wave. Recipients are notified of any changes or replies in all the waves in which they are active. The changes or replies are automatically visible when the user accesses the wave. The ability to modify a wave at any point or location lets users create collaborative documents, edited in a manner akin to wikis. In addition, replies or edits may be updated, letter-by-letter, as they are typed. Although the update of each keystroke as it occurs gives the appearance of being time-based media that is rendered "live", in actuality it is not. Rather each keystroke entry is a separate or discrete event. In contrast with time-based media such as voice or video, the media is continuous and changes over time. Multiple participants may edit a single wave simultaneously. When multiple users are online at the same time, waves are similar to instant messaging. Waves, however, do not support the real-time communication of voice or other time-based media. Consequently, there is no ability to conduct a voice and/or video conversation in real-time using Google wave.

SUMMARY OF THE INVENTION

A browser enabled communication device is disclosed. The communication device includes a processor, a display, a network connection configured to connect the communication device with a remote communication device over a communication network, a browser and a communication application. The communication application and the browser both run on the processor and cooperate to create a user interface that enables a user of the communication device to participate in a conversation with the remote communication device over the communication network. The user interface enables the user to participate in the conversation in either: (i) a real-time mode or (ii) a time-shifted mode and to (iii) seamlessly transition the conversation between the two modes (i) and (ii) so that the media of the conversation may be rendered synchronously when in the real-time mode or asynchronously when in the time-shifted mode.

BRIEF DESCRIPTION OF THE DRAWINGS

The invention may best be understood by reference to the following description taken in conjunction with the accompanying drawings, which illustrate specific embodiments of the invention.

It should be noted that like reference numbers refer to like elements in the figures.

DETAILED DESCRIPTION OF SPECIFIC EMBODIMENTS

The invention will now be described in detail with reference to various embodiments thereof as illustrated in the accompanying drawings. In the following description, specific details are set forth in order to provide a thorough understanding of the invention. It will be apparent, however, to one skilled in the art, that the invention may be practiced without using some of the implementation details set forth herein. It should also be understood that well known operations have not been described in detail in order to not unnecessarily obscure the invention.

Messages and Conversations

"Media" as used herein is intended to broadly mean virtually any type of media, such as but not limited to, voice, video, text, still pictures, sensor data, GPS data, or just about any other type of media, data or information.

As used herein, the term "conversation" is also broadly construed. In one embodiment, a conversation is intended to mean a thread of messages, strung together by some common attribute, such as a subject matter or topic, by name, by participants, by a user group, or some other defined criteria. In another embodiment, the messages of a conversation do not necessarily have to be tied together by some common attribute. Rather one or more messages may be arbitrarily assembled into a conversation. Thus a conversation is intended to mean two or more messages, regardless if they are tied together by a common attribute or not.

Communication System

Figure 1:
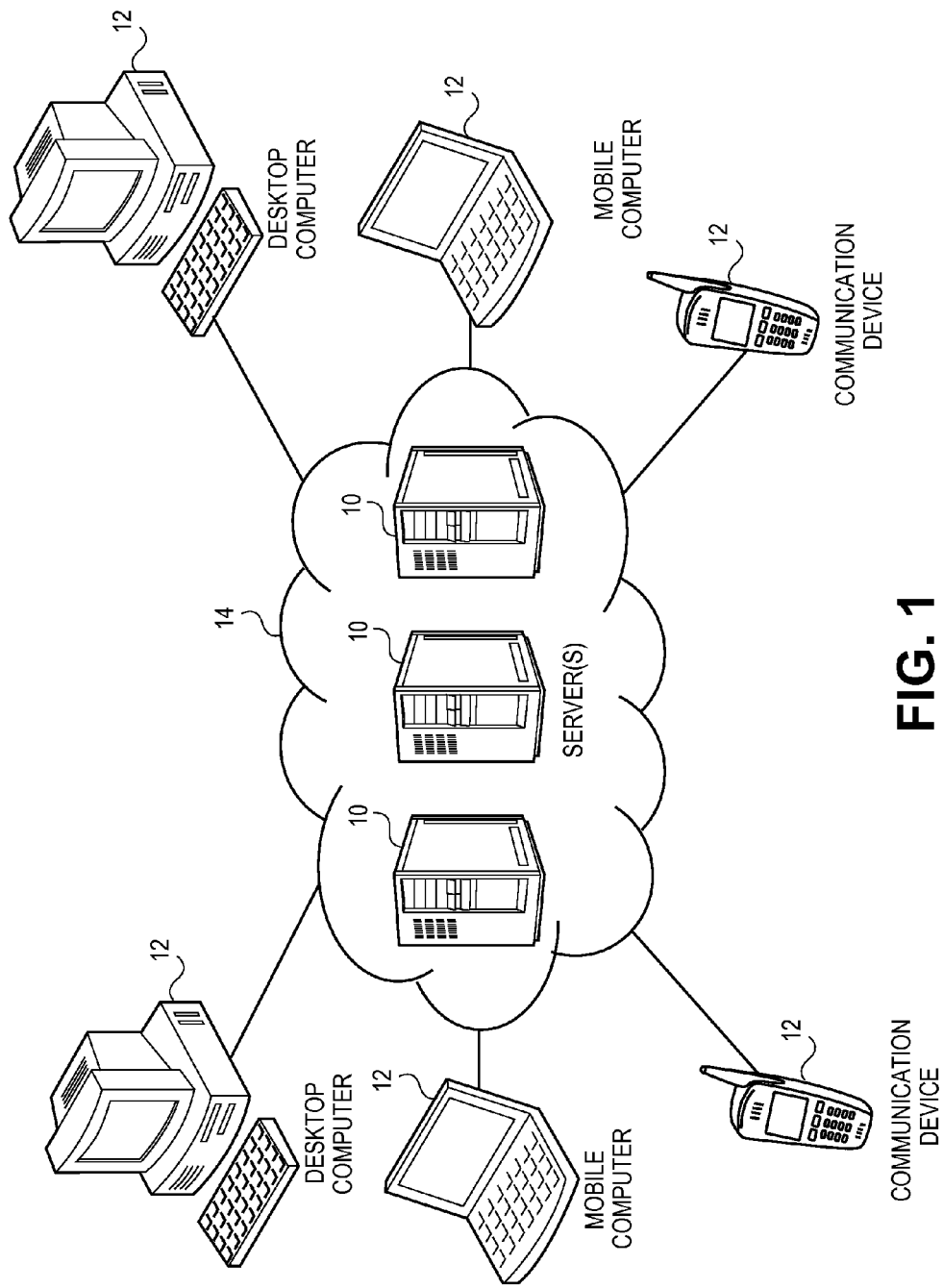
FIG. 1 is diagram of a communication system according to the present invention.

Referring to FIG. 1, a communication system including one or more communication servers 10 and a plurality of client communication devices 12 is shown. A communication services network 14 is used to interconnect the individual client communication devices 12 through the servers 10.

The server(s) 10 run an application responsible for routing the metadata used to set up and support conversations as well as the actual media of messages of the conversations between the different client communication devices 12. In one specific embodiment, the application is the server application described in commonly assigned co-pending U.S. application Ser. No. 12/028,400 (U.S. Patent Publication No. 2009/0003558), Ser. No. 12/192,890 (U.S. Patent Publication No. 2009/0103521), and Ser. No. 12/253,833 (U.S. Patent Publication No. 2009/0168760), each incorporated by reference herein for all purposes. The communication application as described in the above-listed applications enables client communication devices 12 to engage in conversations (i) synchronously in a real-time mode or (ii) asynchronously in a time-shifted mode and to (iii) seamlessly transition the conversation between the two modes (i) and (ii). The conversations may include multiple types of media, including voice, text, video, sensor data, GPS data, etc., and are not limited to just voice media as with conventional telephone conversations. In addition, the server(s) 10 may support conversations between more than two parties, such as conference calls between multiple parties.

In various embodiments, each of the server(s) 10 may run only the above-mentioned communication application. In an alternative embodiment, one or more of the server(s) may also be Web servers capable of serving Web content to the client communication devices 12 as well as running the communication application. In yet another alternative embodiment, the communication services network 14 may include, in addition to the Web server(s) 10, one or more stand-alone Web servers (not illustrated) capable of serving Web content.

The client communication devices 12 may be a wide variety of different types of communication devices, such as desktop computes, mobile or laptop computers, mobile or cellular phones, Push To Talk (PTT) devices, PTT over Cellular (PoC) devices, radios, satellite phones or radios, VoIP phones, or conventional telephones designed for use over the Public Switched Telephone Network (PSTN). The above list should be construed as exemplary and should not be considered as exhaustive. Any type of communication device may be used.

The network 14 may in various embodiments be the Internet, PSTN, a circuit-based network, a mobile communication network, a cellular network based on CDMA or GSM for example, a wired network, a wireless network, a tactical radio network, a satellite communication network, any other type of communication network, or any combination thereof. The network 14 may also be either heterogeneous or homogeneous network.

Clients

Figure 2:
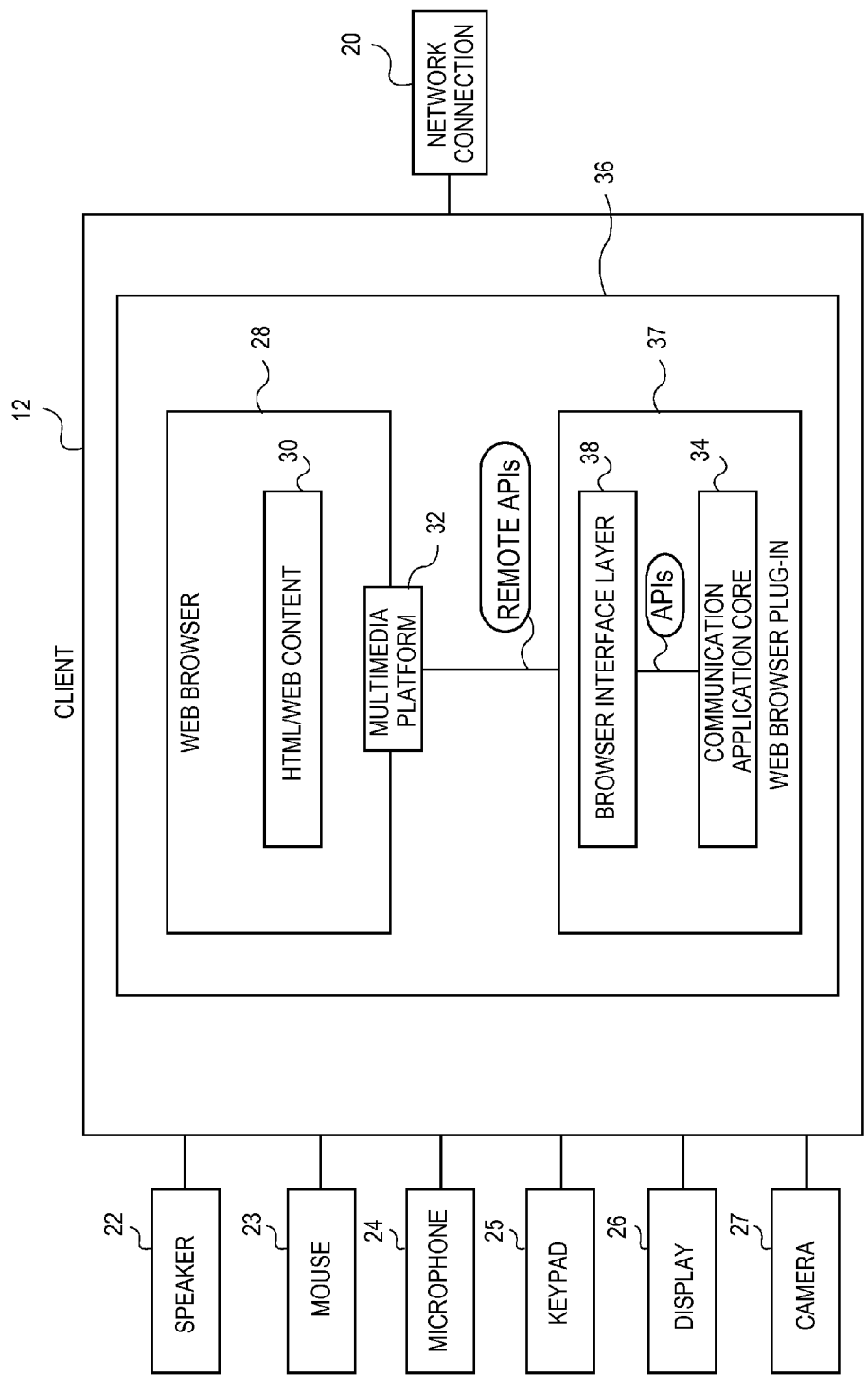
FIG. 2 is a diagram of a client communication device according to the present invention.

Referring to FIG. 2, a block diagram of a client communication device 12 according to one embodiment of the present invention is shown. The client communication device 12 includes a network connection 20 for connecting the client communication device 12 to the network 14, a speaker 22 for rendering voice and other audio based media, a mouse 23 for cursor control and data entry, a microphone 24 for voice and other audio based media entry, a keyboard or keypad 25 for text and data entry, a display 26 for rendering image or video based media at the client communication device 12, and a camera 27 for capturing either still photos or video using the client communication device 12. It should be noted that elements 22 through 27 are each optional and are not necessarily included on all implementations of a client communication device 12. In addition, the display 26 may be a touch-sensitive display capable of receiving inputs using a pointing element, such as a pen, stylus or finger. In yet other embodiments, client communication devices 12 may optionally further include other media generating devices (not illustrated), such as sensor data (e.g., temperature, pressure), GPS data, etc.

The client communication device 12 also includes a Web browser 28 configured to generate and display HTML/Web content 30 on the display 26. An optional multimedia platform 32, such as Adobe Flash, provides audio, video, animation, and other interactivity features within the Web browser 28. The multimedia platform 32 communicates with an underlying communication application 34 using remote Application Programming Interfaces or APIs, as is well known in the art.

The Web browser 28 may be any well-known software application for retrieving, presenting, and traversing information resources on the Web. In various embodiments, well known browsers such as Internet Explorer by Microsoft, Firefox by the Mozilla Foundation, Safari by Apple, Chrome by Google, Opera by Opera Software for desktop, mobile, embedded or gaming systems, or any other browser may be used. Regardless of the browser, information resources are identified by a Uniform Resource Locator (URL) and may be a Web page, image, video, or any other type of content. Hyperlinks present in resources enable users to easily navigate their browsers to related resources. Once content has been retrieved, the browser 28 is responsible for rendering the images, audio, video, data, text and/or related XML files defined by the retrieved Web page, typically creating a user-friendly interface on the display 26 and/or speaker 22 of client communication device 12. In various embodiments, the browser 28 further includes a host of user interface features, such as backward and forward buttons, refresh or reload buttons, a stop button for stopping the loading of content, a home button to return to a home page, an address bar to input URLs, a search bar to input search terms into a search engine, a status bar, and other features typically found on Web browsers. Although the browser 28 is primarily intended to access the World Wide Web, in alternative embodiments, the browser 28 can also be used to access information provided by servers in private networks or content in file systems.

The client communication device 12 also includes a communication application 34 that enables the client communication device 12 to set up and engage in conversations with other client communication devices 12 (i) synchronously in the real-time mode, (ii) asynchronously in the time-shifted mode and to (iii) seamlessly transition the conversation between the two modes (i) and (ii). The conversations may also include multiple types of media, including voice, text, video, sensor data, etc. In one specific embodiment, the communication application is the client application described in commonly assigned co-pending U.S. application Ser. Nos. 12/028,400, 12/192,890, and 12/253,833, each incorporated by reference herein for all purposes.

The client communication device 12 also includes a Web browser plug-in 37 and a browser interface layer 38. The Web-browser plug-in 37 provides well-known "plug-in" functionality of services offered by the browser 28. The browser interface layer 38 acts as an interface between the Web browser 28 and the core of communication application 34. The browser interface layer 38 is responsible for (i) invoking the various user interface functions implemented by the communication application 34 and presenting the appropriate user interfaces through the content presented through browser 28 to the user of client communication device 12 and (ii) receiving inputs from the user through the browser and other inputs on the client communication device 12, such as mouse 23, keyboard or keypad 25, or touch display 26 and providing these inputs to the communication application 34. As a result, the user of the client communication device 12 may control the operation of the communication application 34 when setting up, participating in, or terminating conversations through the Web browser 28 and the other input/output devices 22 through 27 optionally provided on the client communication device 12.

The various software components including the browser 28, multimedia platform 32, communication application 34, Web browser plug-in 37 and browser interface layer 38, all run or are executed on a underlying processor core 36. The processor core 36 may be any computing hardware platform, such as those based on, but not limited to, microprocessors developed by Intel or AMD, which are typically used in both desktop and mobile or laptop computers, as well as the microprocessors and/or microcontrollers, such as the ARM processor from ARM, Limited, typically used in mobile communication devices, such as cell or mobile phones.

User Interface

Figure 3:
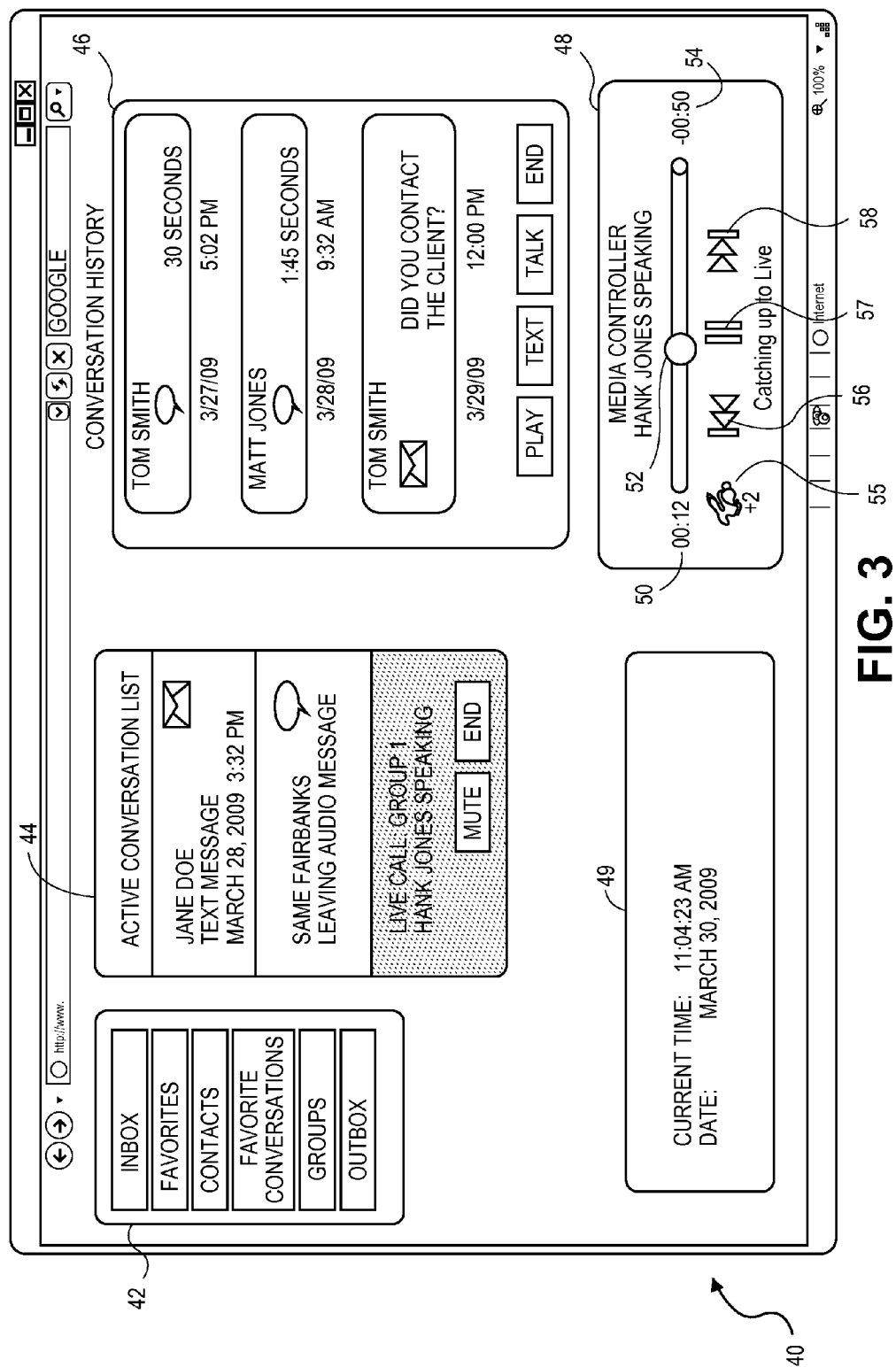
FIG. 3 is a diagram of an exemplary graphical user interface for managing and engaging in conversations on a client communication device according to the present invention.

FIG. 3 is a diagram of an exemplary graphical user interface 40, rendered by the browser 28 on the display 26 of a client communication device 12. The interface 40 includes a folders window 42, an active conversation list window 44, a window 46 for displaying the history of a conversation selected from the list displayed in window 44, a media controller window 48, and a window 49 displaying the current time and date.

The folders window 42 includes a plurality of optional folders, such an inbox for storing incoming messages, a contact list, a favorites contact list, a conversation list, conversation groups, and an outbox listing outgoing messages. It should be understood that the list provided above is merely exemplary. Individual folders containing a wide variety of lists and other information may be contained within the folders window 42.

Window 44 displays the active conversations the user of client communication device 12 is currently engaged in. In the example illustrated, the user is currently engaged in three conversations. In the first conversation, a participant named Jane Doe previously left a text message, as designated by the envelope icon, at 3:32 PM on Mar. 28, 2009. In another conversation, a participant named Sam Fairbanks is currently leaving an audio message, as indicated by the voice media bubble icon. The third conversation is entitled "Group 1". In this conversation, the conversation is "live" and a participant named Hank Jones is speaking. The user of the client communication device 12 may select any of the active conversations appearing in the window 44 for participation.

Further in this example, the user of client communication device 12 has selected the Group 1 conversation for participation. As a result, a visual indicator, such as the shading of the Group 1 conversation in the window 44 different from the other listed conversations, informs the user that he or she is actively engaged in the Group 1 conversation. Had the conversation with Sam Fairbanks been selected, then this conversation would have been highlighted in the window 44. It should be noted that the shading of the selected conversation in the window 44 is just one possible indicator. In various other embodiments, any indicator, either visual, audio, a combination thereof, or no indication may be used.

Within the selected conversation, a "MUTE" icon and an "END" icon are optionally provided. The mute icon allows the user to disable the microphone 24 of client communication device 12, preventing any words spoken by the user from being included in the conversation and heard by the other participants. When the end icon is selected, the user's active participation in the Group 1 conversation is terminated. At this point, any other conversation in the list provided in window 44 may be selected. In this manner, the user may transition from conversation to conversation within the active conversation list. The user may return to the Group 1 conversation at anytime.

The conversation window 46 shows the history of the currently selected conversation, which in this example again, is the Group 1 conversation. In this example, a sequence of media bubbles each represent the media contributions to the conversation respectively. Each media bubble represents the media contribution of a participant to the conversation in time-sequence order. In this example, Tom Smith left an audio message that is 30 seconds long at 5:02 PM on Mar. 27, 2009. Matt Jones left an audio message 1 minute and 45 seconds in duration at 9:32 AM on Mar. 28, 2009. Tom Smith left a text message, which appears in the media bubble, at 12:00 PM on Mar. 29, 2009. By scrolling up or down through the media bubbles appearing in window 46, the entire history of the Group 1 conversation may be viewed. For example, by scrolling upward, the earlier media bubbles of the conversation may be retrieved and displayed in the window. By scrolling downward, the more recent media bubbles of the conversation may be retrieved and displayed in the window 46. In various embodiments, the scrolling either up or down through the history of the conversation, from the initial or first media bubble to the last or most recent, may be accomplished using a number of well known methods. For example, window scroll bars or a cursor controlled by a mouse may be used by non-touch screen displays, while an input device, such as a stylus, pen, or finger, may be used with touch-sensitive type displays.

The window 46 further includes a number of icons allowing the user to control his or her participation in the selected Group 1 conversation. A "PLAY" icon allows the user to render the media of a selected media bubble appearing in the window 46. For example, if the Tom Smith media bubble is selected, then the corresponding voice message is accessed and rendered through the speaker 22 on the client communication device 12. With media bubbles containing a text message, the text is typically displayed within the bubble. In either case, when an old message bubble is selected, the media of the conversation is being reviewed in the time-shifted mode. The "TEXT" and the "TALK" icons enable the user of the client communication device 12 to participate in the conversation by either typing or speaking a message respectively. The "END" icon removes the user from participation in the conversation.

When another conversation is selected from the active list appearing in window 44, the history of the newly selected conversation appears in the conversation history window 46. Thus by selecting different conversations from the list in window 44, the user may switch participation among multiple conversations.

The media controller window 48 enables the user of the client communication device 12 to control the rendering of voice and other media of the selected conversation. The media controller window operates in two modes, the synchronous real-time mode and the asynchronous time shifted mode, and enables the seamless transition between the two modes.

When in the real-time mode, the window 48 includes an identifier pertaining to the incoming message, used to identify the sender of the message. In this example as illustrated, the identifier states "Hank Jones Speaking". A timer 50 showing the current running time of a live message (i.e., "00.12" seconds) when in the real-time mode.

The window 48 further includes a number of visual and control icons for reviewing the media of a message in the time-shifted mode. The media controller window may include a "scrubber bar" 52, which provides a visual indicator of the current point with respect to the duration of the message being reviewed in the time-shifted mode. Another timer 54 shows the time duration of a message when in the time-shifted mode. In addition, the window 48 includes a number of render control icons when in the time-shifted mode, including a render rate control "rabbit" icon 55, a jump backward icon 56, a pause icon 57, and a jump forward icon 58.

In the time-shifted mode, the media of a selected message is identified within the window 48. For example (not illustrated), if the previous voice message from Tom Smith sent at 5:02 PM on Mar. 27, 2009, is selected, information identifying this message is displayed in the window 48. The scrubber bar 52 allows the user to quickly traverse a message from start to finish and select a point to start the rendering of the media of the message. As the position of the scrubber bar 52 is adjusted, the timer 54 is updated to reflect the time-position relative to the start time of the message. The pause icon 57 allows the user to pause the rendering of the media of the message. The jump backward icon 56 allows the user to jump back to a previous point in time of the message and begin the rendering of the message from that point forward. The jump forward icon 58 enables the user to skip over media to a selected point in time of the message. The rabbit icon 55 controls the rate at which the media of the message is rendered. The rendering rate can be either faster, slower, or at the same rendering rate the media of the message was originally encoded.

In the real-time mode, the participant creating the current message is identified in the window 48. In the example illustrated, the window identifies Hank Jones as speaking. As the message continues, the timer 50 is updated, providing a running time duration of the message. The jump backward and pause icons 56 and 57 operate as mentioned above. By jumping from the head of the conversation in the real-time mode back to a previous point using icon 56, the conversation may be seamlessly transitioned from the live or real-time mode to the time-shifted mode The jump forward icon 58 is inoperative when at the head of the message since there is no media to skip over when at the head.

The rabbit icon 55 may be used to implement a rendering feature referred to as Catch up To Live or "CTL". This feature allows a recipient to increase the rendering rate of the media of an incoming message until the recipient catches up to the head of the conversation. For example, if the user of the client device joins an ongoing conversation, the CTL feature may be used to quickly review the previous media contributions of the unheard message or messages until catching up to the head of the conversation. At this point, the rendering of the media seamlessly merges from the time-shifted mode to the real-time mode.

It should be noted that the user interface 40 is merely exemplary. It is just one of many possible implementations for providing a user interface for client communication devices 12. It should be understood that the features and functionality as described herein may be implemented in a wide variety of different ways. Thus the specific interface illustrated herein should not be construed as limiting in any regard.

The Communication Application

Figure 4:
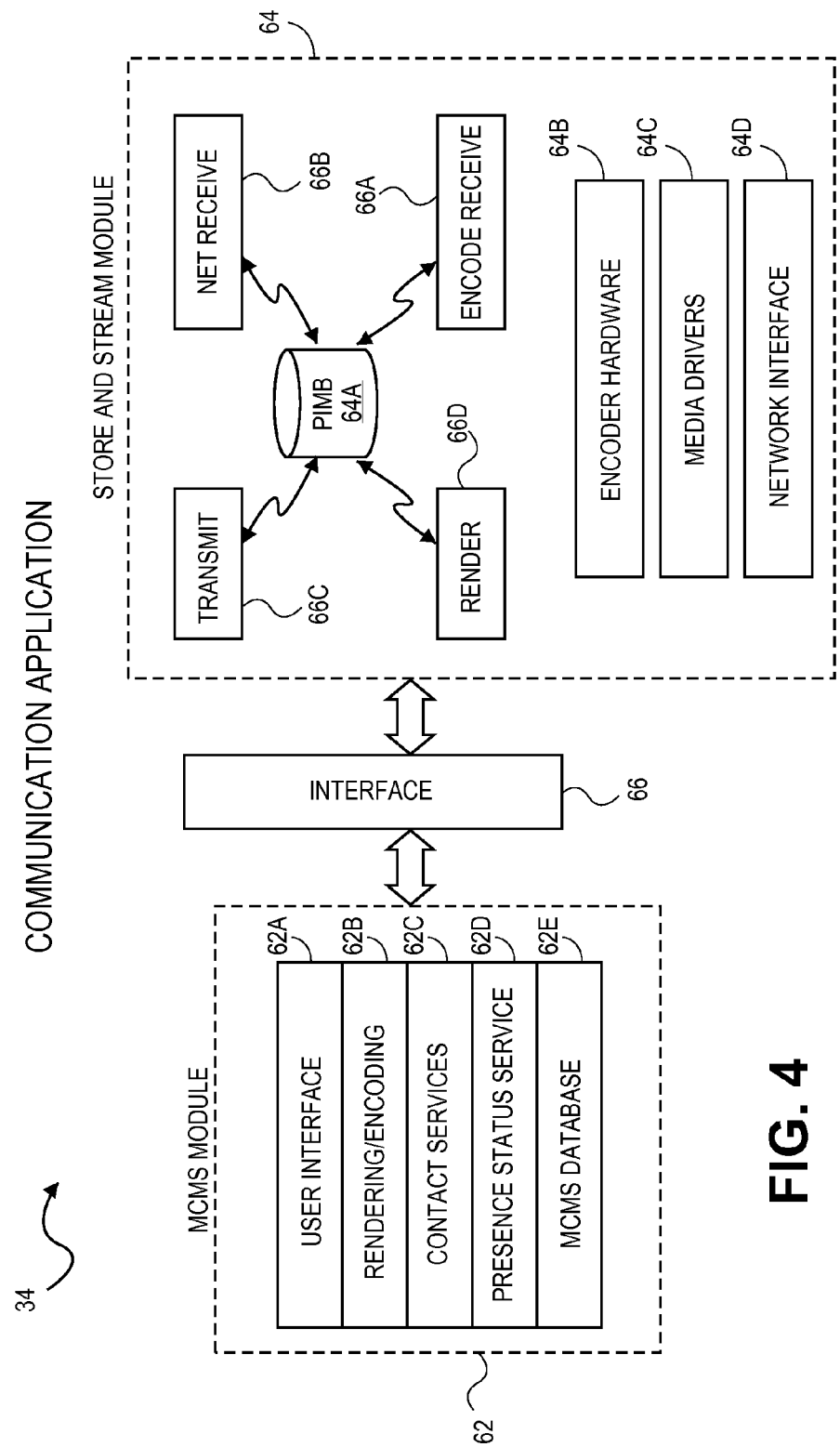
FIG. 4 is a block diagram illustrating a communication application for running on a client communication device according to the present invention.
Figure 5A:
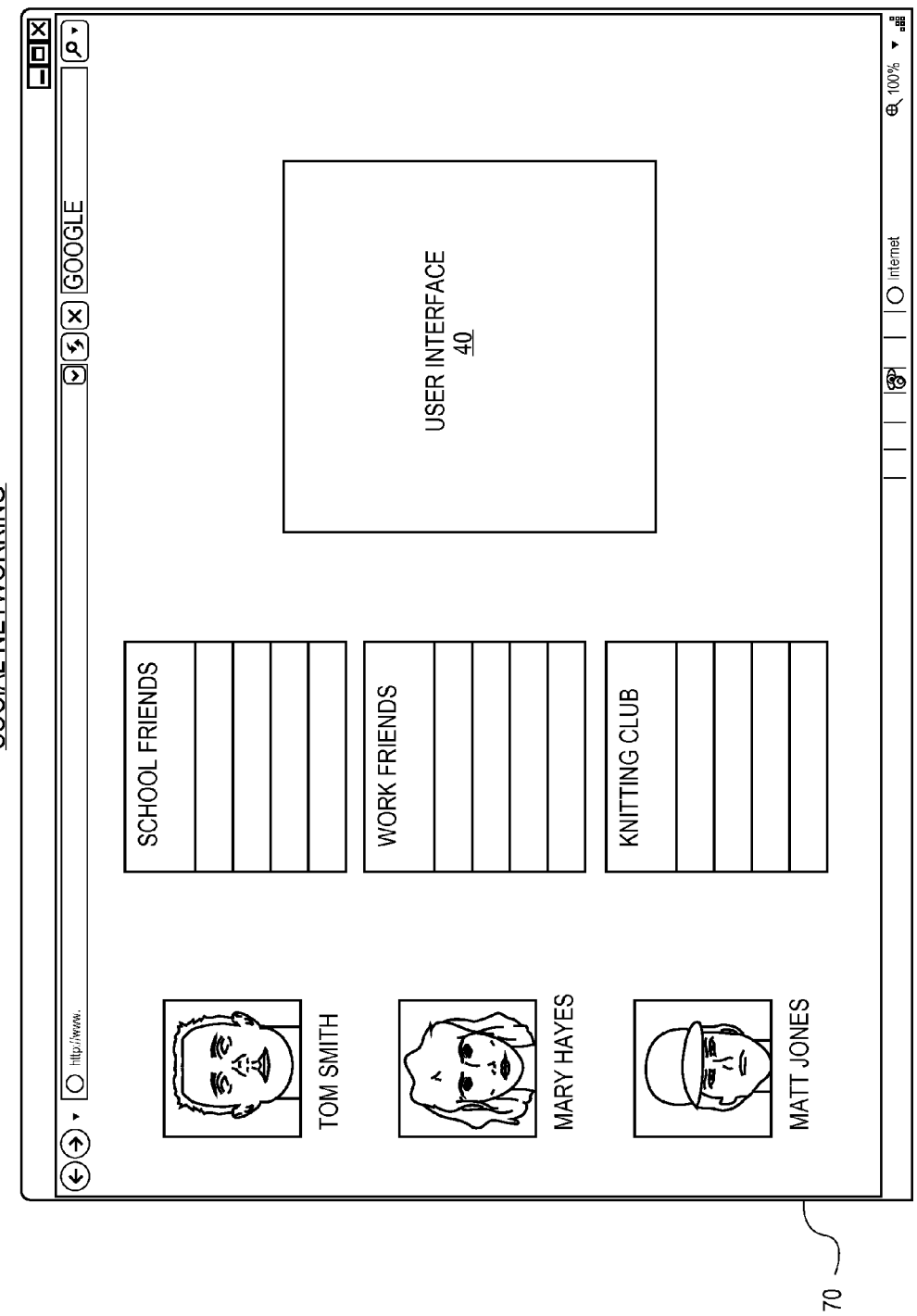
FIGS. 5A through 5E are diagrams illustrating a various Web browser interfaces according to the present invention.
Figure 5B:
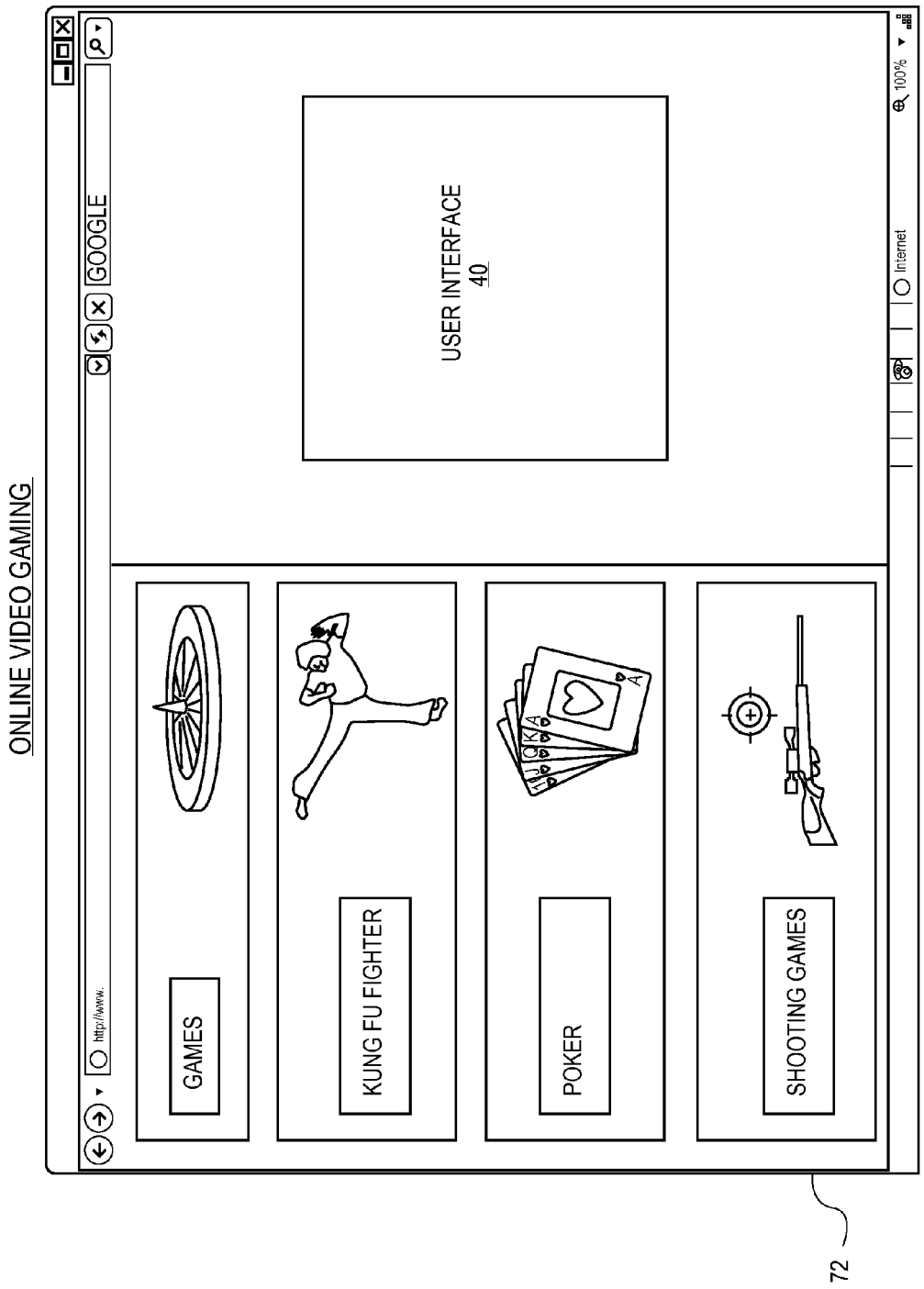
Figure 5C:
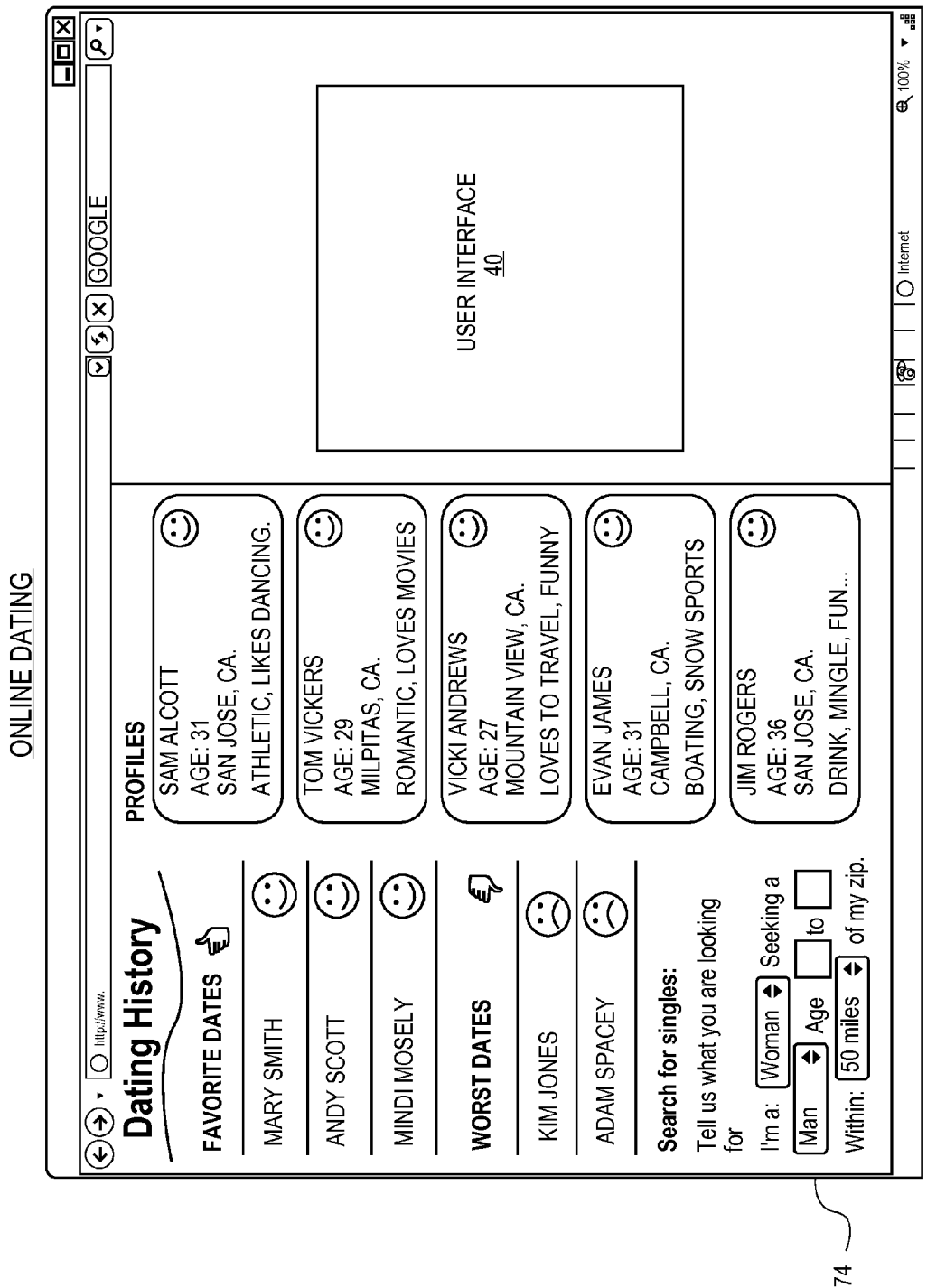
Figure 5D:
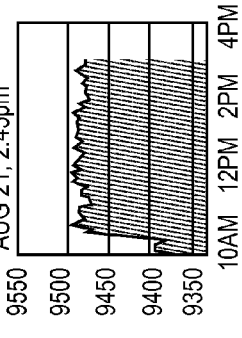
Figure 5E:
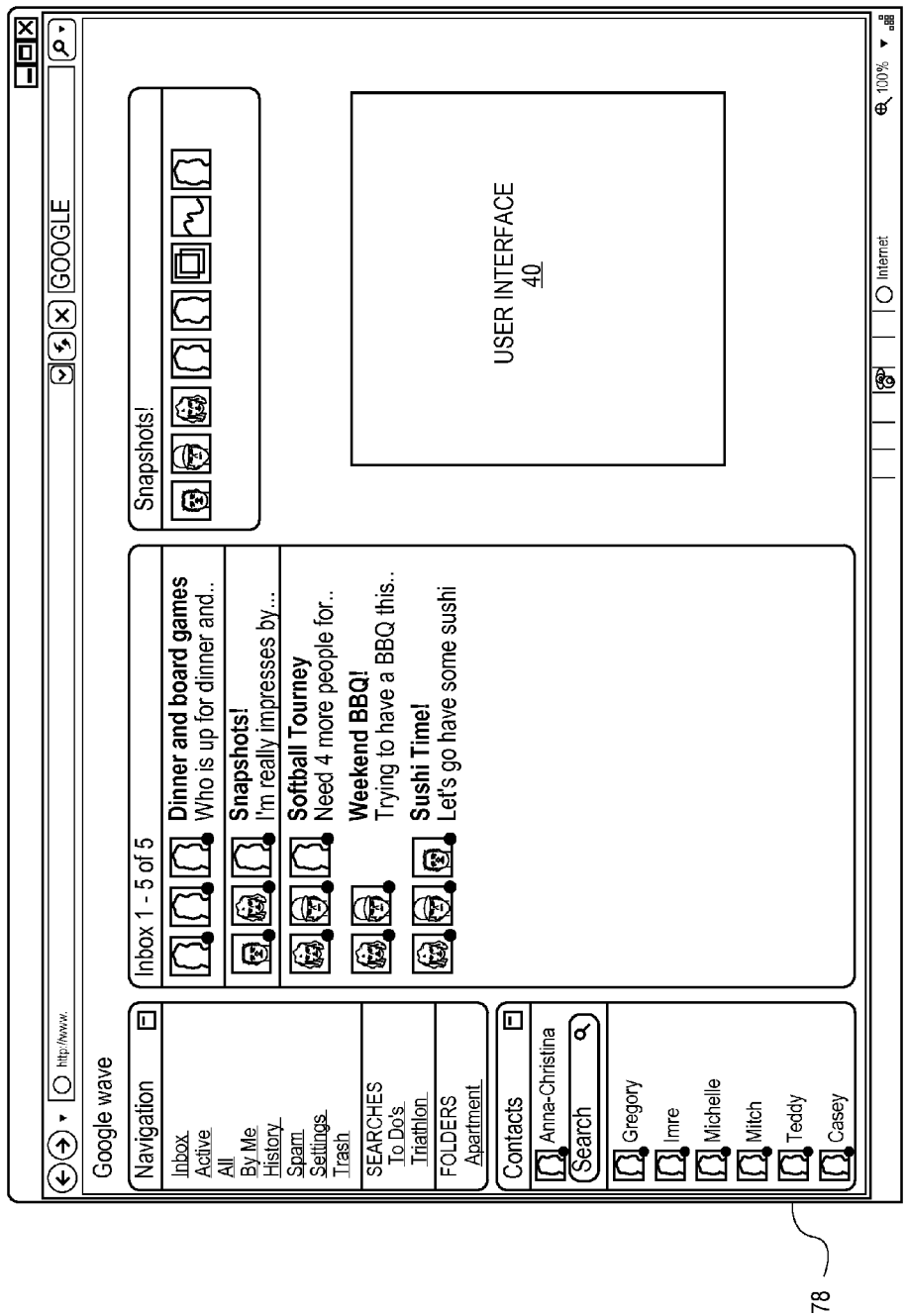

Referring to FIG. 4, a block diagram of the core services or functions performed by the communication application 34 on client communication devices 12 is illustrated. The core services and functions of communication application 34 include a Multiple Conversation Management System (MCMS) module 62, a Store and Stream module 64, and an interface 66 provided between the two modules. The key features and elements of the communication application 34 are briefly described below. For a more detailed explanation, see U.S. application Ser. Nos. 12/028,400, 12/253,833, 12/192,890, and 12/253,820 (U.S. Patent Publication No. 2009/0168759), all incorporated by reference herein.

The MCMS module 62 includes a number of modules and services for creating, managing, and conducting multiple conversations. The MCMS module 62 includes a user interface module 62A for supporting the audio and video functions on the client communication device 12, rendering/encoding module 62B for performing rendering and encoding tasks, a contacts service 62C for managing and maintaining information needed for creating and maintaining contact lists (e.g., telephone numbers and/or email addresses), a presence status service 62D for sharing the online status of the user of the client communication device 12 and which indicates the online status of the other users and the MCMS data base 62E, which stores and manages the metadata for conversations conducted using the client communication device 12.

The Store and Stream module 64 includes a Permanent Infinite Memory Buffer or PIMB 64A for storing in a time-indexed format the time-based media of received and sent messages, encoder hardware 64B for encoding the media, such as voice, video or sensor data generated using for example the microphone 24, touch display 26, camera 27, or sensors on client communication device 12, media drivers 64C for driving the media generating components, such as speaker 22 and display 26 and a network interface 64D for connecting the client communication device 12 to the network 14, either through a wireless or wired connection.

The store and stream module 64 also includes modules for encode receive 66A, net receive 66B, transmit 66C and render 66D. The encode receive function 66A involves the receiving, encoding, time-indexing and storing in the PIMB 64A media created using the communication client communication device 12 in a time-indexed format. The net receive function involves the time-indexing and storing in the PIMB the media contained in messages received from others over the network 14 at client communication device 12. The transmit function 66C transmits the media of messages created on the client communication device 12 to other recipients over the network 14. The render module 64D enables the client communication device 12 to render the media of messages either synchronously in the near real-time mode or asynchronously in the time-shifted mode by retrieving media stored in the PIMB 64A. The modules 66A through 66D enable the Store and Stream module 64 to (i) progressively and simultaneously transmitting time-based media over the network 14 as it is being created using a client communication device 12 and (ii) rendering time-based media either as it is being received over the network 14 in the synchronous mode or from the PIMB 64A in a time-shifted mode.

The persistent storage of messages, regardless if they are discrete or part of a conversation, enables a number of different rendering options. For example, the rendering of media on a client communication device 12 may include rendering options such as play faster (i.e., the media is played faster than it was originally encoded), play slower (i.e., the media is played slower than it was originally encoded), pause, jump backward to a selected previous point in time of a message or conversation, jump to the head of a message or conversation, or Catch-up-To Live (CTL). With the CTL rendering option, the previously received media of an incoming message or messages are rendered out of the PIMB 64A at a rate faster than it was originally encoded. Eventually, the rendering of the media catches up to the live point of the conversation (i.e., the head of the conversation), at which point, the system seamlessly transitions from the time-shifted to the near real-time mode.

The communication application 34 enables a client communication device 12 to engage in one or more conversations. The messages of each conversation, regardless if tied together by a common attribute or not, are persistently stored in the PIMB 64A in a time-indexed order. When a particular message is selected for rendering, the corresponding media of the selected message is retrieved from the PIMB 64A and either displayed in the case of text and/or rendered in the case of audio or video.

Real-Time Communication Protocols

The transmit module 64C may rely on a number of real-time communication protocols. In one optional embodiment, the module 64C may use the Cooperative Transmission Protocol (CTP) for near real-time communication, as described in U.S. application Ser. Nos. 12/192,890 and 12/192,899 (U.S. Patent Publication No. 2009/0103560), all incorporated by reference herein for all purposes. In another optional embodiment, a synchronization protocol that maintains the synchronization of time-based media between a sending and receiving client communication device 12, as well as any intermediate server 10 hops on the network 14, may be used. In yet another optional embodiment, the module 64C may use SMTP mail protocol modified to support real-time communication, as described in U.S. application Ser. No. 12/419,861, also incorporated by reference herein for all purposes.

With the optional CTP protocol embodiment, media for transmission is ascertained as either time-sensitive or not time-sensitive, depending if the recipient of the media has the intent to review the media either synchronously (i.e., "live") in the near real-time mode or asynchronously in the time-shifted mode. When network bandwidth is insufficient to transmit a full bit rate representation of time-sensitive media at a bit rate sufficient to support "live" communication, a reduced bit rate representation of the media is transmitted to maintain "live-ness." Media that is ascertained as not time-sensitive, meaning the recipient has not indicated the intent to review the media in the real-time mode, is transmitted when bandwidth in excess of what is needed for any current time-sensitive media becomes available. When the media ascertained as not time-sensitive is transmitted, the rate of transmission is adjusted at the sending node based on network conditions. Typically, the adjusted rate of transmission for media ascertained as not time-sensitive is set for network efficiency and reliable delivery relative to the timeliness of the delivery of media ascertained as time-sensitive. In various embodiments, the intent of a recipient to review media in the real-time or time-shifted modes may be either a declared intent or inferred from the behavior of the recipient.

In addition, CTP includes provisions for making sure that a recipient eventually receives a full bit rate representation of sent media, regardless if the missing media was lost or corrupted during transmission or the recipient previously received only a reduced bit rate version of the media to support "live-ness." In either case, the CTP defers retransmission of the full bit rate version of the media when the quality of the network is sufficient to support live communication. In other words, the retransmission occurs only when excess bandwidth is available. In situations where bandwidth is limited or is being used substantially for ongoing live communication, the retransmission of any missing full bit rate media may be deferred.

With the optional real-time synchronization protocol, the transmit module 64C maintains real-time synchronization of time-based media between client communication devices 12 and server(s) 10 over the network 14. See for example U.S. application Ser. Nos. 12/253,816 and 12/253,820, both incorporated by reference herein for all purposes, for more details.

With the optional real-time email protocols, the transmit module 64C may use the existing email infrastructure to support the near real-time transmission of time-based media by modifying the way the SMTP or other proprietary email protocols, such as those used by Microsoft Exchange (hereafter generically referred to as "email protocols"), are used. Current email protocols do not strictly require that an entire message be available for sending before delivery is started, although this is typically how email protocols are used. Time-based media can therefore be delivered progressively, as it is being created, using standard SMTP or other proprietary email protocols.

With the real-time email embodiment, the net receive module 66B supports the receipt of the time-based media associated with an email as the media is received in real-time. Conventional email is typically delivered to user devices through an access protocol like POP or IMAP. These protocols do not support the progressive delivery of messages as they are arriving. However, by making simple modifications to these access protocols, a message may be progressively delivered to a recipient as the media of the message is arriving over the network. Such modifications include the removal of the current requirement that the email server know the full size of the email message before the message can be downloaded to the client communication device 12. By removing this restriction from network receive module 66B, a client communication device 12 may begin rendering the time-based media of an email message as the time-based media of the email message is received over the network 14.

Addressing and Route Discovery

In one optional embodiment, the recipient(s) of messages may be addressed using telephone numbers and Session Internet Protocol or SIP for setting up and tearing down communication sessions between client communication devices 12 over the network 14. In various other optional embodiments, the SIP protocol is used to create, modify and terminate either IP unicast or multicast sessions. The modifications may include changing addresses or ports, inviting or deleting participants, or adding or deleting media streams. As the SIP protocol and telephony over the Internet and other packet-based networks, and the interface between the VoIP and conventional telephones using the PSTN are all well known, a detailed explanation is not provided herein. In yet another embodiment, SIP can be used to set up sessions between client communication devices 12 using the CTP protocol described above.

An advantage of using email protocols for real-time communication as described above is that email addresses and the existing DNS infrastructure may be used for identifying the participants of a conversation or the recipients of messages, while using the existing DNS infrastructure for route discovery. As a result, real-time conversations and the delivery of messages may occur in real-time, using the existing email infrastructure and global email addressing scheme, without the need of telephone numbers, the PSTN, or the protocols needed to support VoIP calls.

Web Sites

With the Internet and World Wide Web becoming pervasive, Web sites that create or define communities are become exceedingly popular. For example, Internet users with a common interest tend to aggregate at select Web sites where they can converse and interact with others having the same interests. Social networking sites like facebook.com, online dating sites like match.com, video game sites like addictivegames.com, and other forums, such as stock trading, hobbies, etc., have all become very popular. Up to now, members of these various Web sites could communicate with each other by either email or instant messaging style interactions within the Web page. Some sites support the creation of voice and video messaging, and other sites support live voice and video communication. None, however, allow members to communication either synchronously in the real-time mode or asynchronously in the time-shifted mode or to transition communication between the two modes.

By displaying Web pages with the user interface 40, or variations thereof, embedded into the Web pages appearing on the display of client communication devices 12, users may communicate time-based media with one another in either the real-time or time-shifted modes, with the ability to seamlessly transition between those modes, within the context of the Web page. In FIGS. 5A through 5E for example, the user interface 40 is shown embedded in a social networking site 70, an online video gaming site 72, an online dating site 74, a stock trading forum 76, and within a Google wave 78 respectively. When users of client communication devices 12 running the communication application 34 access these and similar Web sites, they may conduct conversations, including multiple media types, with other members, in either the real-time or time-shifted modes, as described in detail herein. For example, two friends on Facebook may conduct a conversation through the interface 40 embedded in the Facebook Web pages as they are displayed on the client communication devices 12. Similarly, two individuals on a dating Web site may connect and begin conversing, either live or in a time-shifted mode, using various media types, such as voice, video and/or text. Although a number of popular Web-based communities have been mentioned herein, it should be understood that this list is not exhaustive. The number of Web sites is virtually unlimited and there are far too many Web sites to list herein. In each case, the Web content appearing within the browser running on the client communication device 12 is served by either server(s) 10 when capable of serving Web content and/or by separate Web servers within the network 14.

Figure 6A:
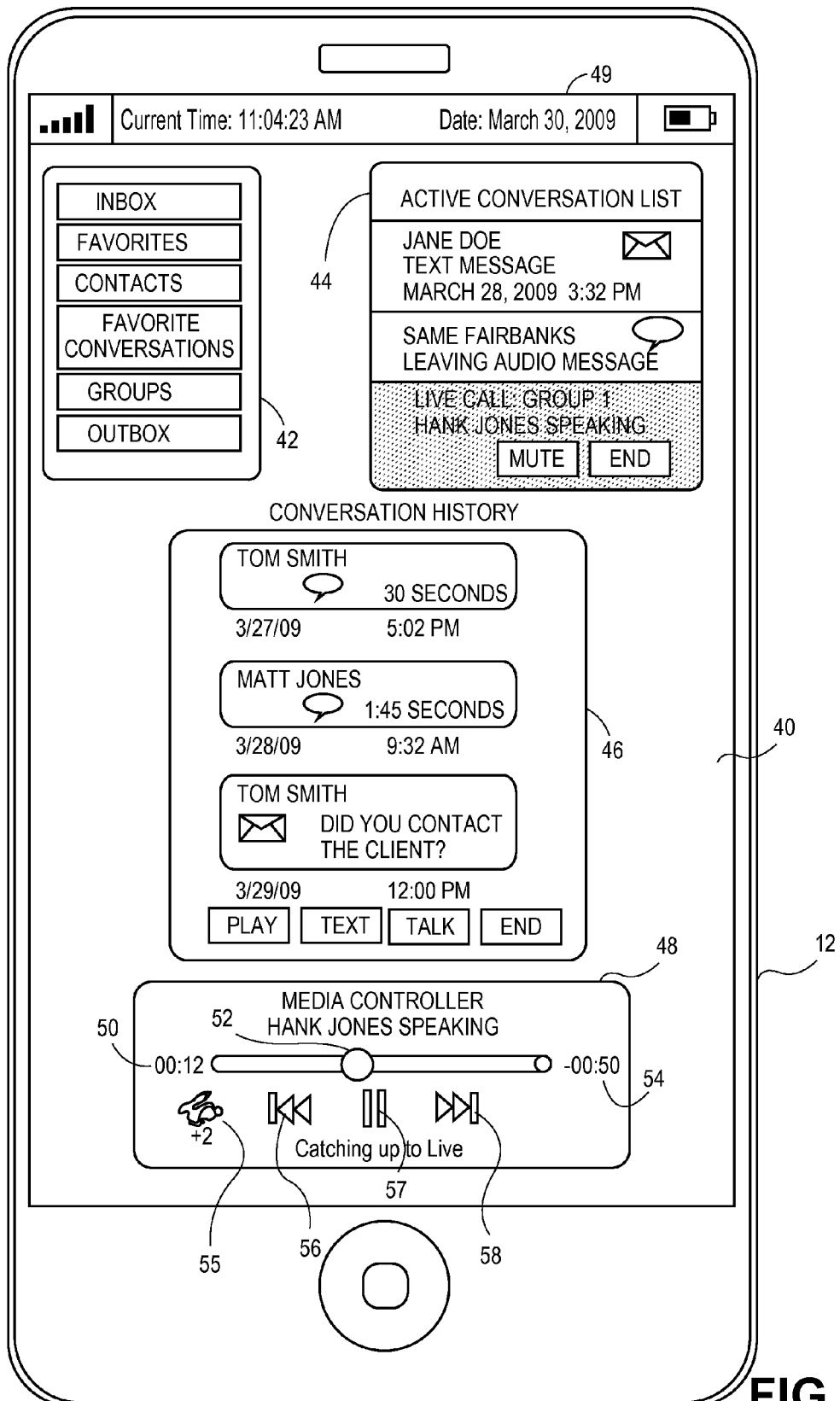
FIGS. 6A and 6B are diagrams of a Web browser user interface displayed on a mobile client communication device according to the present invention.

Referring to FIG. 6A, a diagram of a browser-enabled display on a mobile client communication device 12 according to the present invention is shown. In this example, the user interface 40 is provided within the browser-enabled display of a mobile client communication device 12, such as a mobile phone or radio. It should be understood that the user interface 40 as shown is merely exemplary and is intended to show the various features and functions as described above. In various embodiments, the functions and features as described herein may be implemented in numerous ways. In addition, the mobile client communication device 12 as provide may rely on any real-time communication protocol, such as those discussed herein, including CTP, a modified version of SMTP or other proprietary email protocols. Furthermore, the mobile client communication device 12 may rely on SIP for setting up and tearing down sessions over packet-based and non-packet based networks and/or the existing DNS infrastructure for addressing and route discovery as described herein.

Figure 6B:
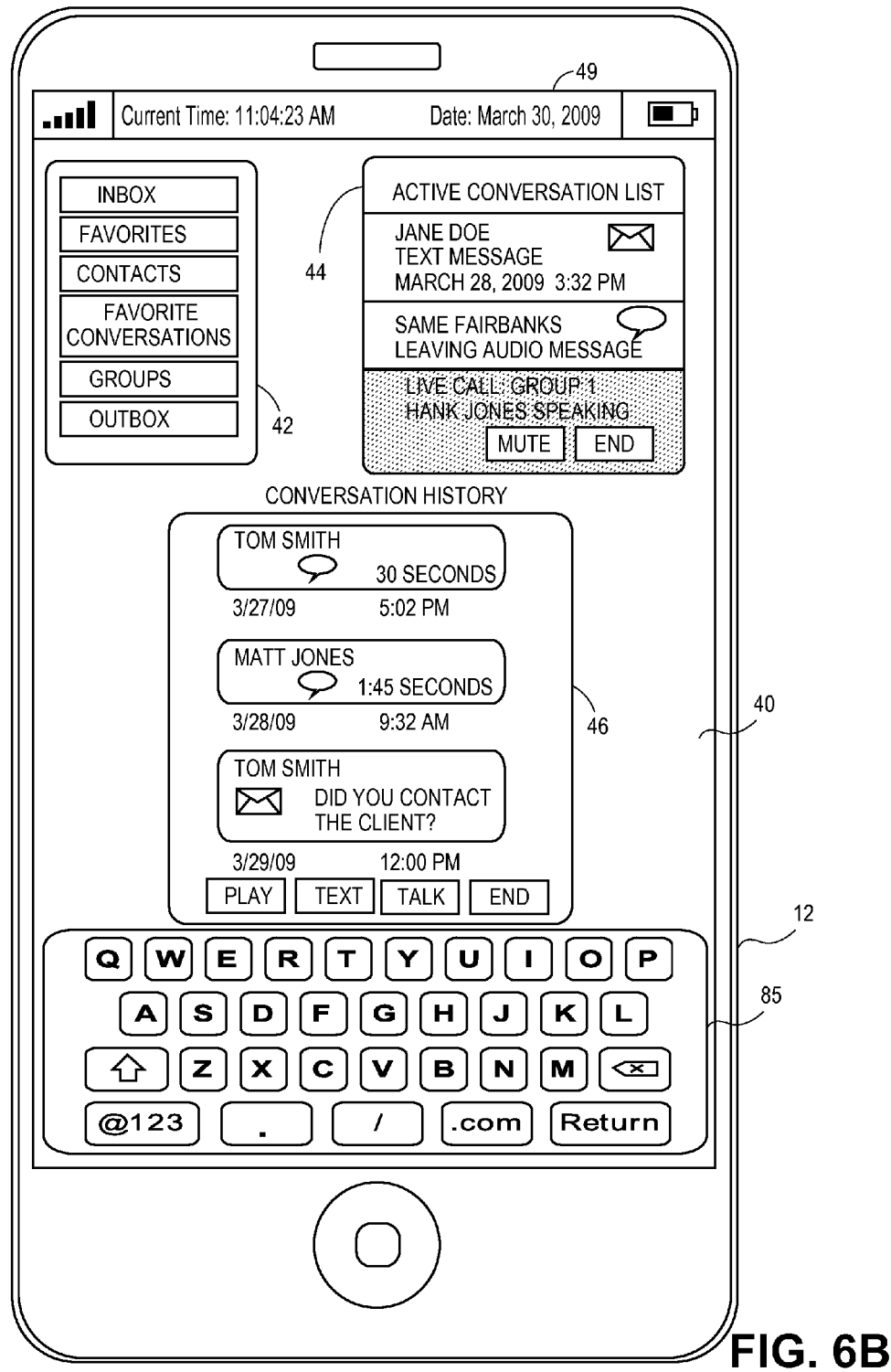

FIG. 6B is a diagram of the mobile client communication device 12 with a keyboard 85 superimposed onto the browser display. With the keyboard 85, the user may create text messages, for example, after selecting the TEXT option appearing in window 46 in FIG. 3 for example. In this manner, the user may create a text message during participation in conversations. With mobile client communication devices 12 having a dedicated keyboard, such as with desktop computers, laptops and other mobile computers, and certain mobile phones, there obviously is no need to create a keyboard in the browser-enabled display of the mobile client communication device 12 as illustrated in FIG. 6B.

While the invention has been particularly shown and described with reference to specific embodiments thereof, it will be understood by those skilled in the art that changes in the form and details of the disclosed embodiments may be made without departing from the spirit or scope of the invention. For example, embodiments of the invention may be employed with a variety of components and methods and should not be restricted to the ones mentioned above. It is therefore intended that the invention be interpreted to include all variations and equivalents that fall within the true spirit and scope of the invention.

What is claimed is:

1. A client communication device, comprising:
   a processor;
   a display;
   a network connection configured to connect the client communication device with a communication network;
   a browser; and
   code configured to enable communication with a remote communication device over the communication network,
   the code and the browser cooperating to create a user interface which enables a user of the client communication device to actively participate in a conversation with the remote communication device over the communication network, the user interface enabling the user to selectively and actively participate in the conversation in:
   (i) a real-time mode by progressively rendering voice media of incoming voice messages received over the communication network from the remote communication device as the voice media is received;
   (ii) a time-shifted mode by progressively rendering the received voice media of the incoming voice messages from storage some time after the voice media was transmitted by the remote communication device and stored; and
   (iii) to selectively transition participation in the conversation between the two modes (i) and (ii),
   the code further configured to enable the user to actively participate in the conversation, via user interaction with the user interface, by progressively transmitting outgoing voice messages pertaining to the conversation created using the client communication device as the voice media of the outgoing messages is created,
   the code further configured to cooperate with the browser to present, via the user interface, a message history of the conversation, the message history including a conversation thread of the incoming and outgoing voice messages in a time order in which the voice messages were added to the conversation.

2. The client communication device of claim 1, wherein the code is further capable of supporting one or more media types, in addition to the voice media, so that the voice media and the one or more media types can be exchanged during the conversation between the client communication device and the remote communication device.

3. The client communication device of claim 2, wherein the one or more media types, in addition to the voice media, comprises:
   (i) position data;
   (ii) video;
   (iii) text;
   (iv) GPS data;
   (v) pictures;
   (vi) sensor data; or
   (vii) any combination of (i) through (vi).

4. The client communication device of claim 1, wherein the code and the browser further cooperate to present, via the user interface, a list of active conversations.

5. The client communication device of claim 4, wherein the code and the browser further cooperate to enable the user of the client communication device to select, via the user interface, the conversation among the list of active conversations for participation.

6. The client communication device of claim 1, wherein the conversation thread comprises one or more media bubbles each representative of the incoming and outgoing voice messages respectively.

7. The client communication device of claim 6, wherein the one or more media bubbles are presented in the time order in which the incoming and outgoing voice messages were added to the conversation respectively.

8. The client communication device of claim 6, wherein a selected one of the media bubbles includes one of the following:
   (i) a voice media type indicator which indicates that voice media is associated with the selected media bubble;
   (ii) a date and time indicator indicative of the date and the time when the voice media associated with the selected media bubble was created;
   (iii) a name indicator indicative of the name of the participant of the conversation that created the voice media associated with the selected media bubble; or
   (iv) any combination of (i) through (iii).

9. The client communication device of claim 1, wherein the user interface provides one or more of the following rendering options for rendering the voice media of the messages of the conversation:
   (i) play;
   (ii) pause;
   (iii) jump forward;
   (iv) jump backward; and
   (v) Catch-up-To-Live (CTL).

10. The client communication device of claim 1, wherein the user interface provides an end function to end participation in the conversation.

11. The client communication device of claim 1, wherein the user interface provides a mute function.

12. The client communication device of claim 1, wherein the user interface provides a text function which enables the user of the client communication device to contribute text messages to the conversation and to receive text messages from the remote communication device, the code and the browser further configured to insert the text messages in the message history of the conversation by including the text messages in the conversation thread in the time order in which the text messages were added to the conversation.

13. The client communication device of claim 1, wherein the user interface provides a render control function which enables the user of the client communication device to render a selected voice message of the conversation.

14. The client communication device of claim 1, further comprising a multimedia platform configured to cooperate with the browser to generate content for the user interface appearing in a display associated with the client communication device.

15. The client communication device of claim 1, wherein the code is down loaded over the communication network to the client communication device.

16. The client communication device of claim 1, wherein the communication network comprises one of the following:
   (i) the Internet;
   (ii) the PSTN;
   (iii) a circuit-based network;
   (iv) a mobile communication network;
   (v) a cellular network;
   (vi) a wired network;
   (vii) a wireless network;
   (viii) a satellite network;
   (ix) a tactical network; or
   (x) any combination of (i) through] (ix).

17. The client communication device of claim 1, wherein the incoming and the outgoing voice messages of the conversation share a common attribute, the attribute selected from one of the following:
   (i) a name of a participant of the conversation;
   (ii) a topic of the conversation;
   (iii) a subject defining the conversation; or
   (iv) a group identifier identifying group of participants in the conversation.

18. The client communication device of claim 1, wherein the client communication device is one of the following:
   (i) a land-line phone;
   (ii) a wireless phone;
   (iii) a cellular phone;
   (iv) a mobile phone;
   (v) a satellite phone;
   (vi) a computer;
   (vii) a radio;
   (viii) a server;
   (ix) a tactical radio;
   (x) a satellite radio; or
   (xi) a tactical radio.

19. The client communication device of claim 1, wherein the code further enables the contribution of a text message to the conversation.

20. The client communication device of claim 1, further comprising one or more input devices, the one or more input devices capable of contributing one or more media types to the conversation.

21. The client communication device of claim 1, further comprising one or more output devices, the one or more output devices capable of rendering one or more media types contributed to the conversation.

22. The client communication device of claim 1, further comprising one or more input/output devices, the one or more input/output devices comprises:
   (i) a speaker;
   (ii) a mouse;
   (iii) a microphone;
   (iv) keyboard;
   (v) a display;
   (vi) a touch sensitive display;
   (vii) camera; or
   (viii) any combination of (i) through (vii).

23. The client communication device of claim 1, wherein the code further defines a storage location for storing media associated with the conversation on the client communication device at least while the user of the client communication device is actively participating in the conversation.

24. The client communication device of claim 1, wherein the code further comprises a network transmission protocol capable of progressively transmitting voice media as the voice media is created using the client communication device.

25. The client communication device of claim 1, wherein the code and the browser cooperate to embed at least a portion of the user interface in a Web page appearing on the display of the client communication device.

26. The client communication device of claim 1, further configured to connect to the remote communication device through one or more communication servers located on the communication network.

27. The client communication device of claim 1, wherein the outgoing voice messages of the conversation is addressed using a unique identifier associated with an intended recipient of the outgoing voice messages and the voice media associated with the outgoing voice messages is routed over the communication network using a route discovered by a lookup result of the unique identifier.

28. The client communication device of claim 1, wherein the code is further configured to provide presence status of the user of the client communication device to the remote communication device.

29. The client communication device of claim 1, wherein the user interface provides a photo option which enables a user of the client communication device to contribute a photograph to the conversation.

30. The client communication device of claim 1, wherein the code further supports synchronous communication between the client communication device and the remote communication device.

31. The client communication device of claim 1, wherein the code further supports asynchronous communication between the client communication device and the remote communication device.

32. The client communication device of claim 1, wherein the code is further configured to store on the client communication device at least a portion of the voice media of the conversation while the user of the client communication device is actively participating in the conversation.

33. Computer code embedded in a non-transitory computer readable medium and intended to run on a client communication device connected to a network, the computer code comprising:
  code for cooperating with a browser on the client communication device, the code configured to create, within the browser, a user interface which enables a user of the communication device to actively participate in a conversation with a remote communication device over a communication network, the user interface enabling the user to selectively, and actively participate in the conversation in:
  (i) a real-time mode where voice media of incoming voice messages from the remote communication device is rendered as it is received at the client communication device over the network;
  (ii) a time-shifted mode where voice media of the incoming voice messages from the remote communication device is rendered out of storage some time after the voice media was transmitted by the remote communication device; and
  (iii) to selectively transition participation in the conversation between the two modes (i) and (ii),
  the code further configured to enable the user to actively participate in the conversation, via user interaction with the user interface, by progressively transmitting outgoing voice messages pertaining to the conversation created using the client communication device as the voice media of the outgoing messages is created,
  the code further configured to cooperate with the browser to present, via the user interface, a message history of the conversation, the message history including a conversation thread of the incoming and outgoing voice messages in a time order in which the voice messages were added to the conversation.

34. The code of claim 33, wherein the code is further capable of supporting one or more media types, in addition to the voice media, so that the voice media and the one or more media types can be exchanged during the conversation between the client communication device and the remote communication device.

35. The code of claim 34, wherein the one or more media types, in addition to voice, comprises:
  (i) position data;
  (ii) video;
  (iii) text;
  (iv) GPS data;
  (v) pictures;
  (vi) sensor data; or
  (vii) any combination of (i) through (vi).

36. The code of claim 33, wherein the code is further configured to cooperate with the browser to present, via the user interface, a list of active conversations.

37. The code of claim 36, wherein the code is further configured to cooperate with the browser to enable the user of the client communication device to select, via the user interface, the conversation for participation among the list of active conversations.

38. The code of claim 33, wherein the conversation thread comprises one or more media bubbles each representative of the incoming and outgoing voice messages of the conversation respectively.

39. The code of claim 38, wherein the one or more media bubbles are presented in the time order in which the incoming and outgoing voice messages were added to the conversation respectively.

40. The code of claim 38, wherein a selected one of the media bubbles include one of the following:
  (i) a voice media type indicator which indicates that voice media is associated with the selected media bubble;
  (ii) a date and time indicator indicative of the date and the time when the voice media associated with the selected media bubble was created;
  (iii) a name indicator indicative of the name of the participant of the conversation that created the voice media associated with the selected media bubble; or
  (iv) any combination of (i) through (iii).

41. The code of claim 38, wherein code further cooperates with the browser to provide within the user interface one or more of the following rendering options for rendering the voice media of the messages of the conversation:
  (i) play;
  (ii) pause;
  (iii) jump forward;
  (iv) jump backward; and
  (v) Catch-up-To-Live (CTL).

42. The code of claim 33, wherein the code cooperates with the browser to provide within the user interface an end function for ending participation in the conversation.

43. The code of claim 33, wherein the code cooperates with the browser to provide within the user interface a mute function.

44. The code of claim 33, wherein the code cooperates with the browser to provide within the user interface a text function for contributing text messages to the conversation and to receive text messages from the remote communication device, the code and the browser further configured to insert the text messages in the message history of the conversation by including the text messages in the conversation thread in the time order in which the text messages were added to the conversation.

45. The code of claim 33, wherein the code is further configured to progressively add the voice media to the outgoing voice messages as the voice media is created using the client communication device.

46. The code of claim 45, wherein the code is further configured to progressively transmit the voice media of the voice message as the voice media is created and progressively added to the message.

47. The code of claim 45, wherein the code is further configured to progressively store the voice media of the voice message as the voice media is created.

48. The code of claim 33, wherein the code is further configured to cooperate with the browser to create in the user interface a render control function for rendering selected messages of the conversation on the client communication device.

49. The code of claim 33, wherein the code is further configured to cooperate with a multimedia platform for generating content for the user interface within the browser.

50. The code of claim 33, wherein the incoming and outgoing voice messages of the conversation is share a common attribute, the attribute selected from one of the following:
   (i) a name of a participant of the conversation;
   (ii) a topic of the conversation;
   (iii) a subject defining the conversation; or
   (iv) a group identifier identifying group of participants in the conversation.

51. The code of claim 33, wherein the client communication device is one of the following:
   (i) a land-line phone;
   (ii) a wireless phone;
   (iii) a cellular phone;
   (iv) a mobile phone;
   (v) a satellite phone;
   (vi) a computer;
   (vii) a radio;
   (viii) a server;
   (ix) a tactical radio;
   (x) a satellite radio; or
   (xi) a tactical radio.

52. The code of claim 33, wherein the code relies on a network transmission protocol capable of progressively transmitting voice media as the voice media is created on the client communication device.

53. The code of claim 33, wherein the code is further configured to address the outgoing messages of the conversation using a unique identifier associated with an intended recipient of the outgoing messages and the media of the outgoing messages is routed over the communication network using a route discovered by a lookup result of the unique identifier.

54. The code of claim 33, wherein the code is further configured to store on the client communication device at least a portion of the media of the conversation while the user of the client communication device is actively participating in the conversation.

55. The communication method of claim 33, wherein the code further supports synchronous communication between the client communication device and the remote communication device.

56. The communication method of claim 33, wherein the code further supports asynchronous communication between the client communication device and the remote communication device.

57. A communication method, comprising:
   maintaining a server node on a network;
   providing client code to a client communication device over the network in response to the client communication device accessing the server node, the provided computer comprising: code for cooperating with a browser on the client communication device, the code configured to create, within the browser, a user interface which enables a user of the communication device to actively participate in a conversation with a remote communication device over a communication network, the user interface enabling the user to selectively and actively participate in the conversation in:
   (i) a real-time mode where voice media of incoming voice messages from the remote communication device is rendered as it is received at the client communication device over the network;
   (ii) a time-shifted mode where voice media of the incoming voice messages from the remote communication device is rendered out of storage some time after the voice media was transmitted by the remote communication device; and
   (iii) to transition participation in the conversation between the two modes (i) and (ii),
   the code further configured to enable the user to actively participate in the conversation, via user interaction with the user interface, by progressively transmitting outgoing voice messages pertaining to the conversation created using the client communication device as the voice media of the outgoing messages is created,
   the code further configured to cooperate with the browser to present, via the user interface, a message history of the conversation,
      the message history including a conversation thread of the incoming and outgoing voice messages in a time order in which the voice messages were added to the conversation; and
   routing the incoming and outgoing voice messages between the client communication device and the remote communication device over the network.

58. The communication method of claim 57, wherein the provided code is further capable of supporting one or more media types, in addition to the voice media, so that the voice media and the one or more media types can be exchanged during the conversation between the client communication device and the remote communication device.

59. The communication method of claim 57, wherein the provided code is further configured to cooperate with the browser to present, through via the user interface, a list of active conversations.

60. The communication method of claim 59, wherein the provided code is further configured to cooperate with the browser to enable the user of the client communication device to select, via the user interface, the conversation for participation among the list of active conversations.

61. The communication method of claim 57, wherein the message history of the conversation comprises one or more media bubbles each representative of the incoming and outgoing voice messages of the conversation respectively.

62. The communication method of claim 61, wherein the one or more media bubbles are presented in the time order in which the incoming and outgoing voice messages were added to the conversation respectively.

63. The communication method of claim 57, wherein a selected one of the media bubbles include one of the following:
- (i) a voice media type indicator which indicates that voice media is associated with the selected media bubble;
- (ii) a date and time indicator indicative of the date and the time when the voice media associated with the selected media bubble was created;
- (iii) a name indicator indicative of the name of the participant of the conversation that created the voice media associated with the selected media bubble; or
- (iv) any combination of (i) through (iii).

64. The communication method of claim 57, wherein the provided code further cooperates with the browser to provide, within the user interface, one or more of the following rendering options for rendering the voice media of the messages of the conversation:
- (i) play;
- (ii) pause;
- (iii) jump forward;
- (iv) jump backward; and
- (v) Catch-up-To-Live (CTL).

65. The communication method of claim 57, wherein the user interface created by the code within the browser provides a text function which enables the user of the client communication device to contribute text messages to the conversation and to receive text messages from the remote communication device, the code and the browser further configured to insert the text messages in the message history of the conversation by including the text messages in the conversation thread in the time order in which the text messages were added to the conversation.

66. The communication method of claim 57, wherein the outgoing voice messages of the conversation are addressed using a unique identifier associated with an intended recipient of the outgoing voice message and the voice media associated with the outgoing voice messages is routed over the communication network using a route discovered by a lookup result of the unique identifier.

67. The communication method of claim 57, wherein the code is further configured to provide presence status of the user of the client communication device to the remote communication device over the network.

68. The communication method of claim 57, wherein the user interface provides a photo option which enables a user of the client communication device to contribute a photograph to the conversation.

69. The communication method of claim 57, wherein the code further supports synchronous communication between the client communication device and the remote communication device.

70. The communication method of claim 57, wherein the code further supports asynchronous communication between the client communication device and the remote communication device.

71. The communication method of claim 57, further comprising progressively storing the voice media of the outgoing voice messages and the incoming voice messages at the server node as the voice media is progressively received at the server node.

72. The communication method of claim 57, further comprising:
- progressively storing the voice media of the incoming voice messages at the server node as the voice media is progressively received at the server node from the remote communication device; and
- progressively forwarding the voice media of the incoming voice messages from the server node to the client communication device, as the media is progressively stored at the server node, when the user of the client communication device is actively participating in the conversation in the real-time mode.

73. The communication method of claim 57, further comprising:
- progressively storing the voice media of the incoming voice messages at the server node as the voice media is progressively received at the server node from the remote communication device; and
- progressively forwarding the voice media of the incoming voice message from storage at the server node to the client communication device when the user of the client communication device is participating in the conversation in the time-shifted mode.

* * * * *

UNITED STATES PATENT AND TRADEMARK OFFICE
CERTIFICATE OF CORRECTION

| | | |
|---|---|---|
| PATENT NO. | : 8,533,611 B2 | Page 1 of 1 |
| APPLICATION NO. | : 12/561089 | |
| DATED | : September 10, 2013 | |
| INVENTOR(S) | : Katis et al. | |

It is certified that error appears in the above-identified patent and that said Letters Patent is hereby corrected as shown below:

In the Claims

Claim 59, Column 20, Line 61:   delete "through"

Signed and Sealed this
Tenth Day of December, 2013

Margaret A. Focarino
*Commissioner for Patents of the United States Patent and Trademark Office*